United States Patent [19]
Webb

[11] Patent Number: 5,831,149
[45] Date of Patent: Nov. 3, 1998

[54] PIPE COUPLING ASSEMBLY, SYSTEM AND METHOD

[75] Inventor: Michael C. Webb, Lionville, Pa.

[73] Assignee: Environ Products, Inc., Exton, Pa.

[21] Appl. No.: 528,807

[22] Filed: Sep. 15, 1995

Related U.S. Application Data

[63] Continuation-in-part of Ser. No. 389,004, Feb. 15, 1995, which is a continuation-in-part of Ser. No. 320,665, Oct. 11, 1994, which is a continuation-in-part of Ser. No. 306,680, Sep. 15, 1994, abandoned.

[51] Int. Cl.⁶ .............. B67D 5/06; G01M 3/28; F16L 9/14; F16L 21/08
[52] U.S. Cl. ............ 73/40.5 R; 73/49.1; 285/13; 285/93
[58] Field of Search .................. 73/40, 40.5 R, 73/49.1; 285/13, 93, 133.1

[56] References Cited

U.S. PATENT DOCUMENTS

| | | | |
|---|---|---|---|
| 2,794,658 | 6/1957 | Purkhiser | 285/133.1 X |
| 2,817,230 | 12/1957 | McCully | 73/46 |
| 3,877,293 | 4/1975 | McKeage | 73/49.1 |
| 3,980,112 | 9/1976 | Basham | 285/133.1 X |
| 4,616,676 | 10/1986 | Adams et al. | 285/133.1 X |
| 4,870,856 | 10/1989 | Sharp | 73/40.5 R |
| 4,922,971 | 5/1990 | Grantham | 285/133.1 X |
| 4,932,257 | 6/1990 | Webb | 73/40.5 R |
| 4,971,477 | 11/1990 | Webb et al. | 405/154 |
| 5,016,920 | 5/1991 | Anderson | 285/92 X |
| 5,040,408 | 8/1991 | Webb | 73/40.5 R |
| 5,127,679 | 7/1992 | Pouplier | 285/92 |
| 5,156,421 | 10/1992 | Chauvel | 285/92 X |
| 5,188,398 | 2/1993 | Parimore, Jr. et al. | 285/92 X |
| 5,209,105 | 5/1993 | Hasha et al. | 73/49.1 |
| 5,215,336 | 6/1993 | Worthing | 285/92 X |
| 5,220,822 | 6/1993 | Tuma | 73/40.5 R |
| 5,259,651 | 11/1993 | Sharp | 285/133.1 |
| 5,263,794 | 11/1993 | Webb | 405/52 |
| 5,265,652 | 11/1993 | Brunella | 141/59 |
| 5,277,455 | 1/1994 | Graves et al. | 285/55 |
| 5,297,896 | 3/1994 | Webb | 405/52 |
| 5,301,721 | 4/1994 | Hartman | 141/59 |
| 5,317,899 | 6/1994 | Hutchinson | 73/40.5 R |
| 5,343,191 | 8/1994 | McAtemney | 340/605 |
| 5,343,738 | 9/1994 | Skaggs | 73/40.5 R |
| 5,375,457 | 12/1994 | Trapp | 73/40.7 |
| 5,384,714 | 1/1995 | Kidd | 364/550 |
| 5,390,532 | 2/1995 | Anthony | 73/40.5 R |
| 5,398,977 | 3/1995 | Berger | 285/133.1 |
| 5,408,420 | 4/1995 | Slocum et al. | 364/558 |
| 5,450,833 | 9/1995 | Payne et al. | 141/59 |
| 5,456,502 | 10/1995 | Sharp | 285/133.1 |
| 5,546,992 | 8/1996 | Chick et al. | 138/98 |

FOREIGN PATENT DOCUMENTS

| | | | |
|---|---|---|---|
| 1276007 | 10/1961 | France | 285/133.1 |
| 2249449 | 4/1974 | Germany | 285/133.1 |

*Primary Examiner*—Hezron E. Williams
*Assistant Examiner*—J. David Wiggins
*Attorney, Agent, or Firm*—Seidel, Gonda Lavorgna & Monaco, PC

[57] ABSTRACT

In a pipeline system having a plurality of pipe segments joining a fluid supply tank to a fluid dispenser, the invention includes a pipe coupling assembly for use on at least one terminal end of a fluid transfer pipe, where the transfer pipe has an inner tubular member for transferring fluid and an outer tubular member and an interstitial space therebetween. The coupling assembly comprises a transition coupling for attachment to the pipe segment to provide a first path for the fluid in the inner tubular member and a second path for the interstitial space. The coupling assembly further comprises a transition fitting for attachment to the transition coupling to provide separate paths for the transfer fluid and the interstitial space, where the interstitial space provides a means for performing leak detection or fitting integrity tests during application of either a vacuum condition or pressurized gas input via such selective access.

11 Claims, 12 Drawing Sheets

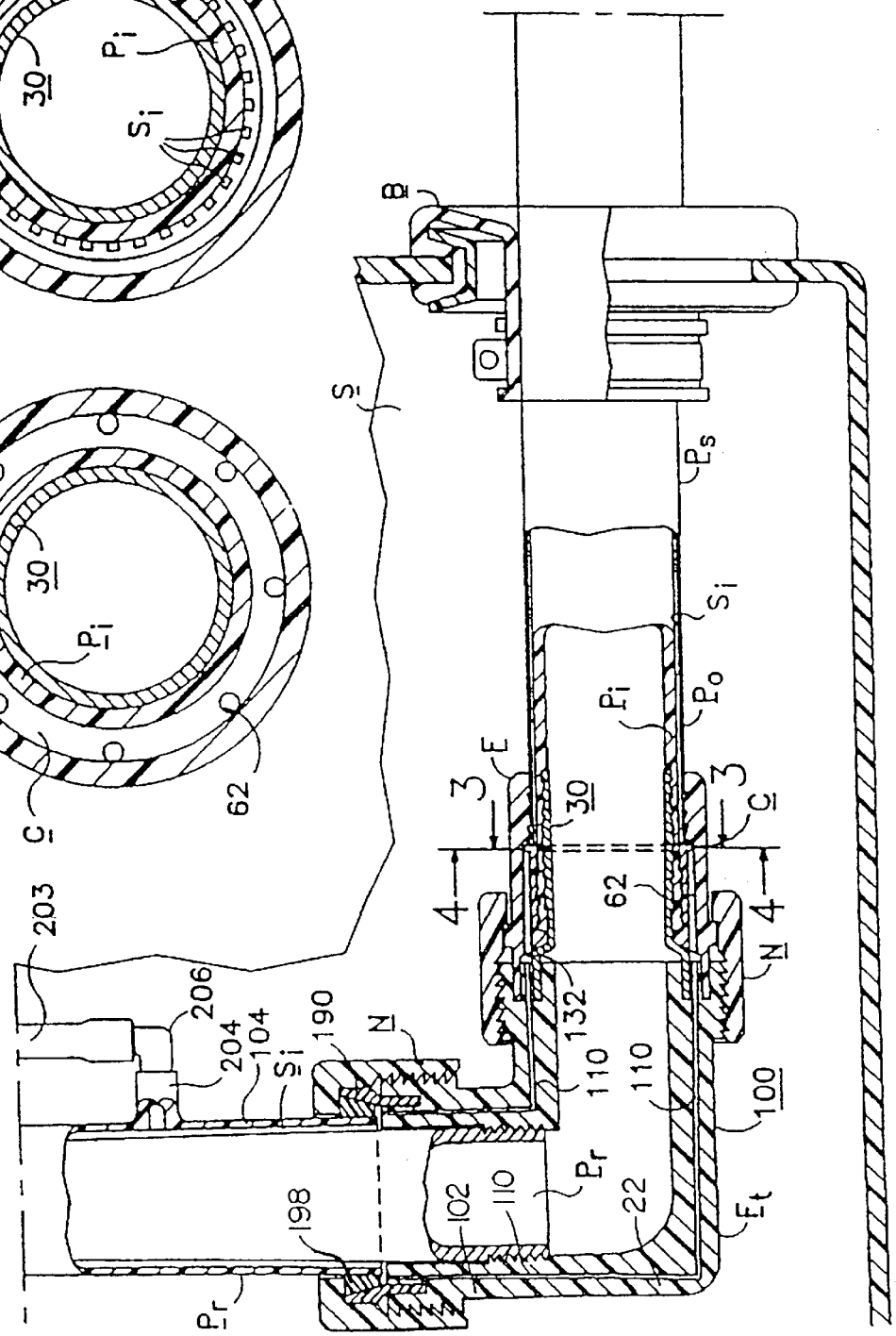

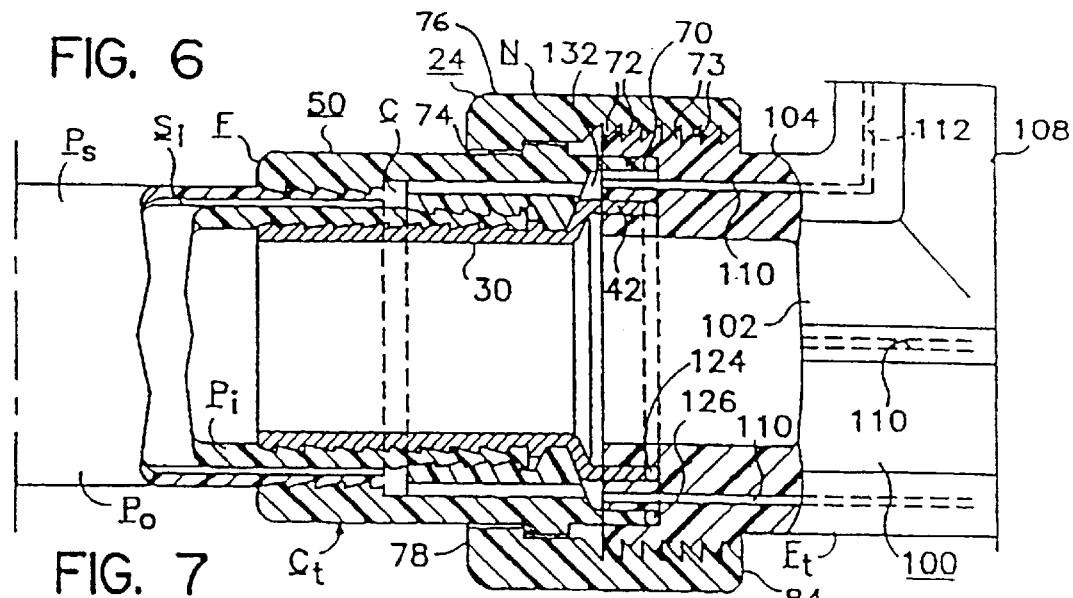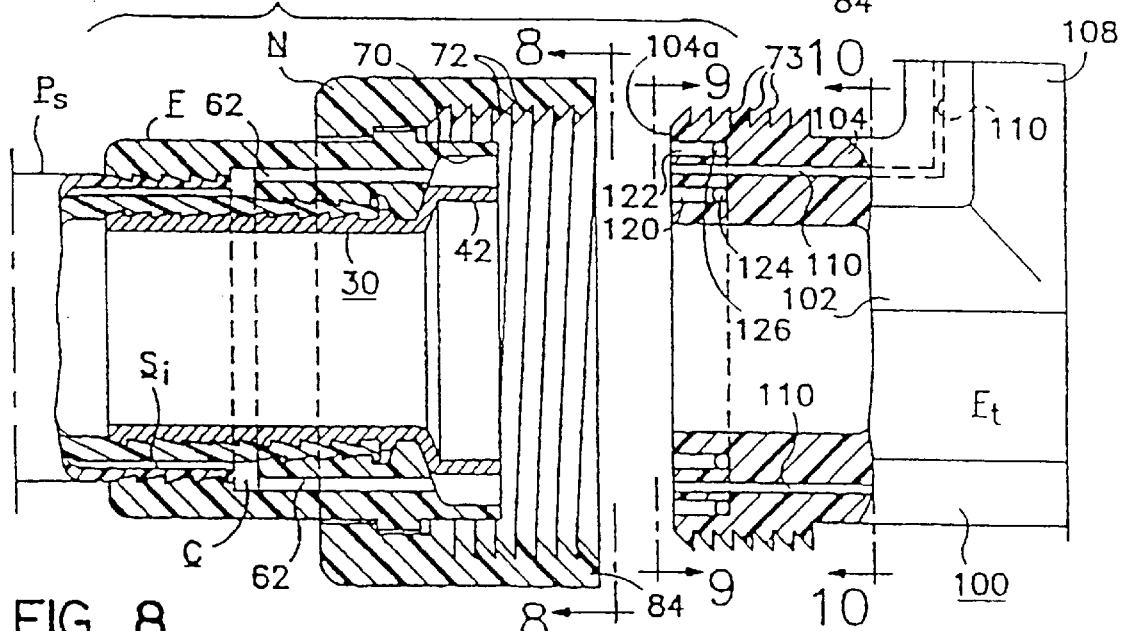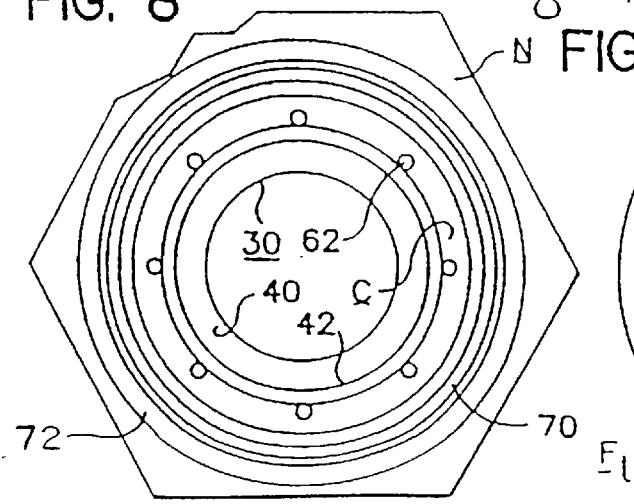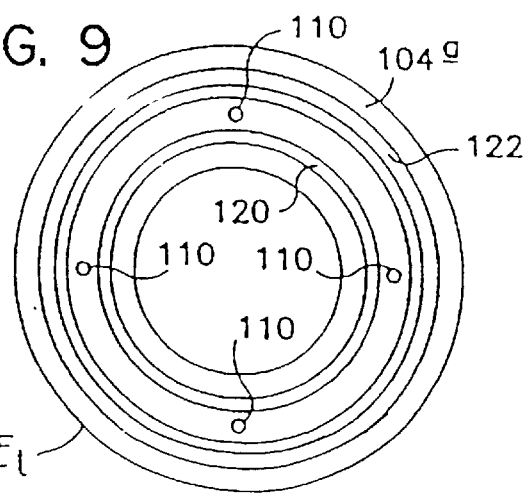

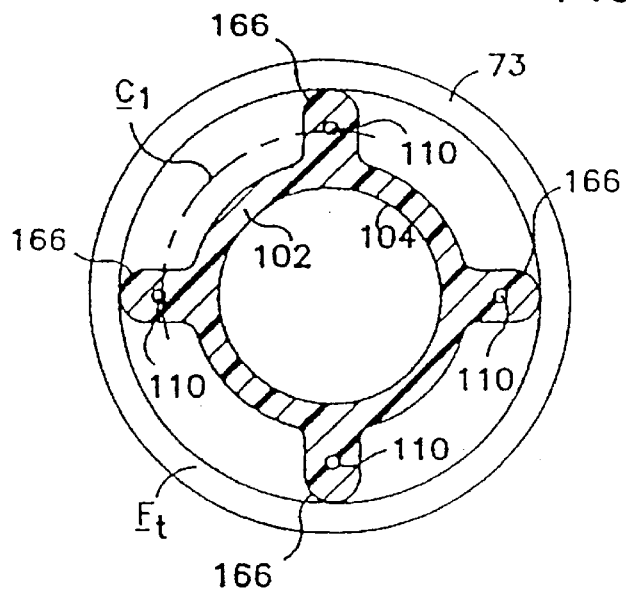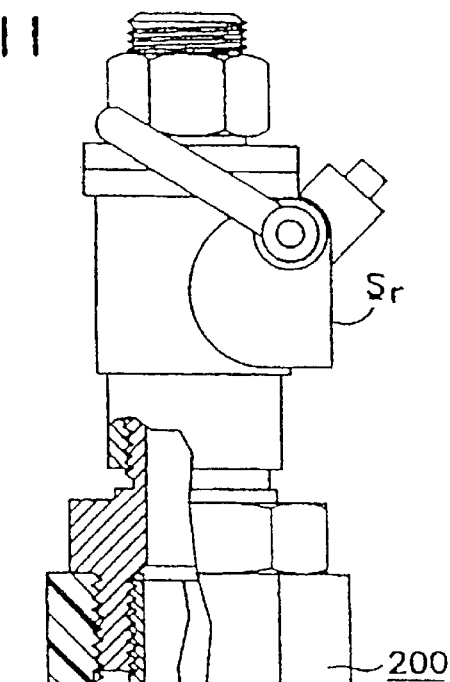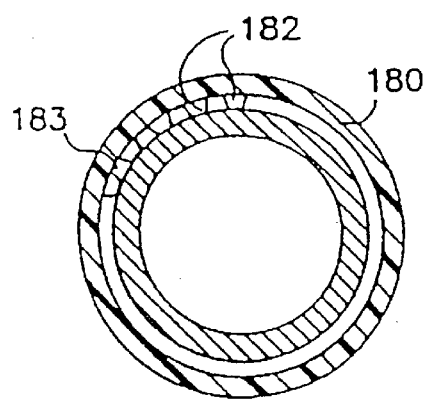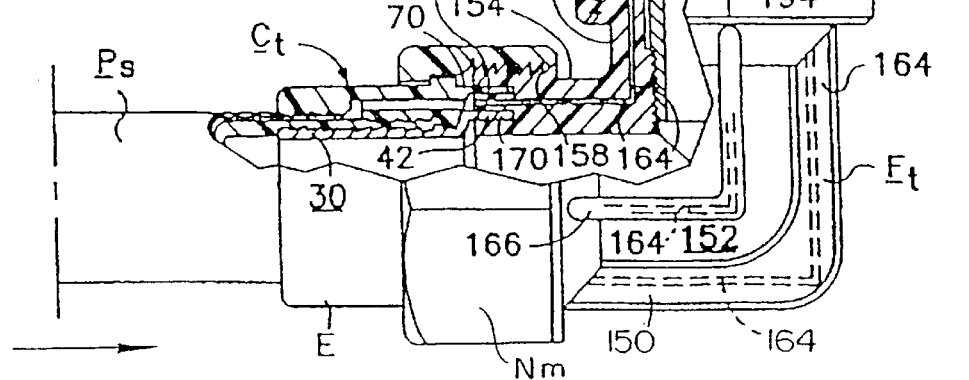

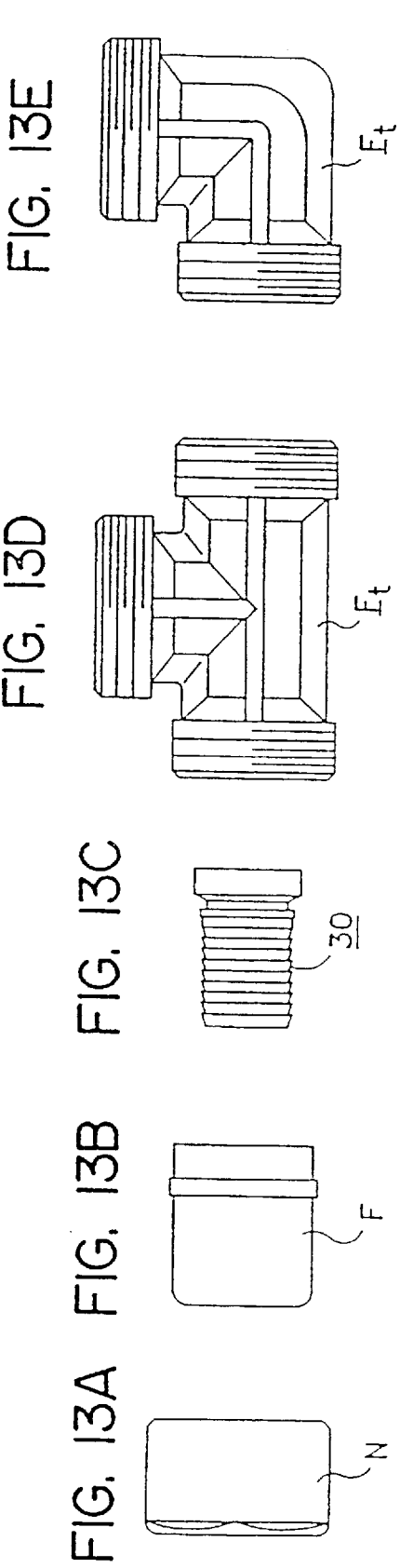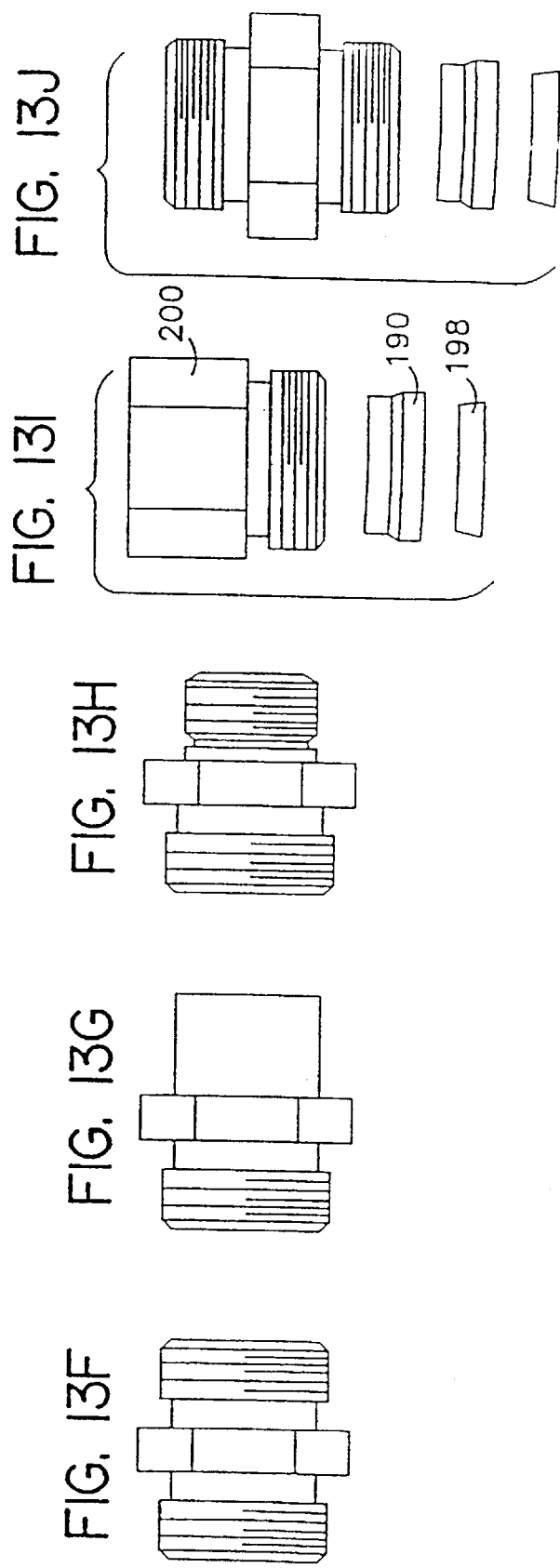

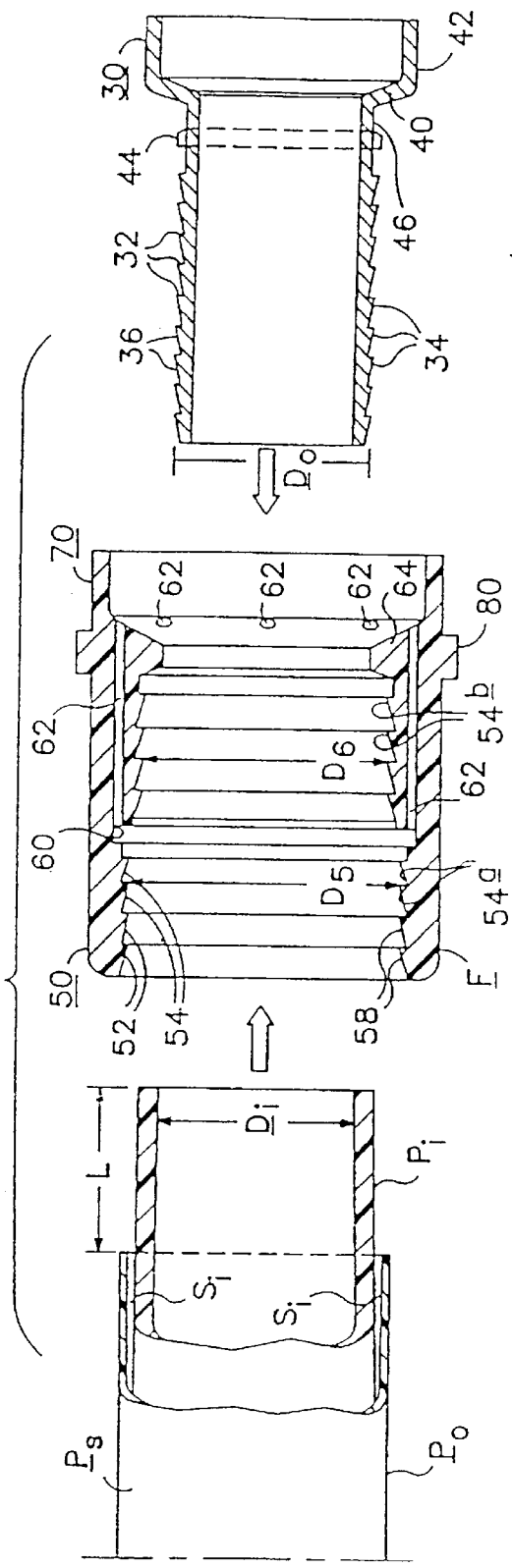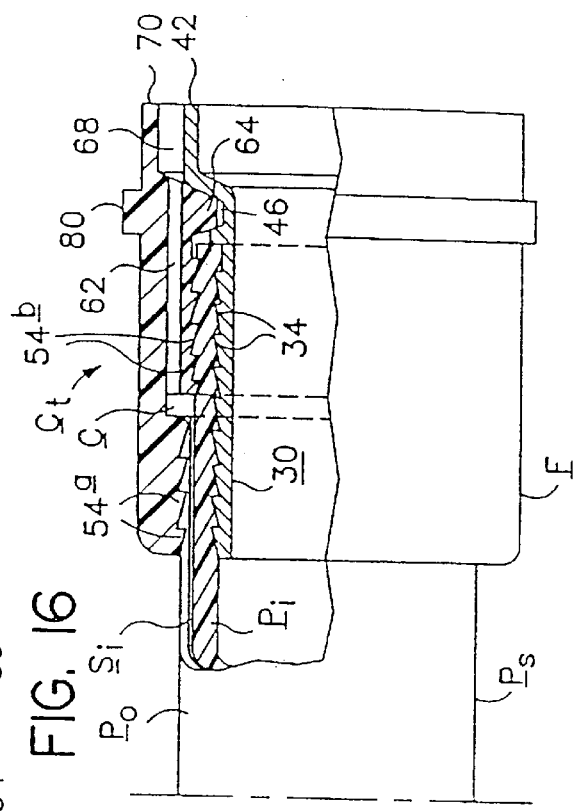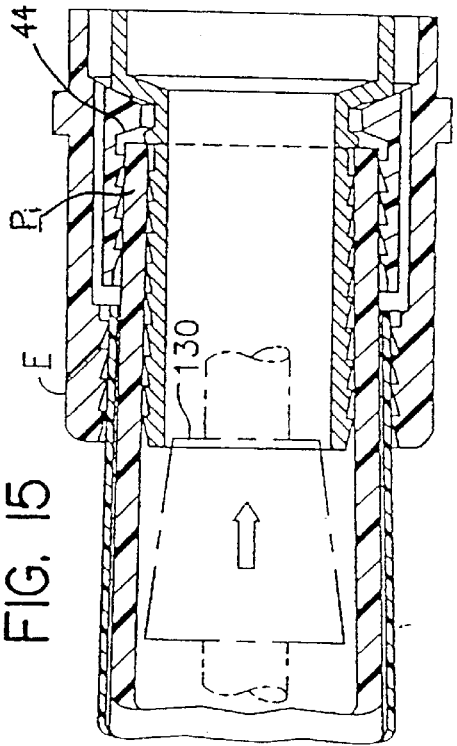

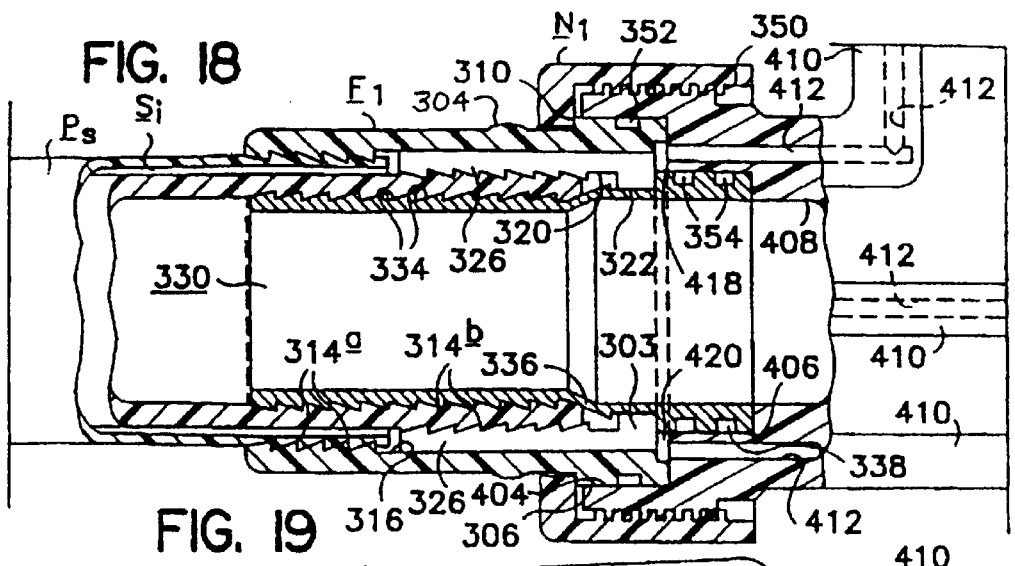
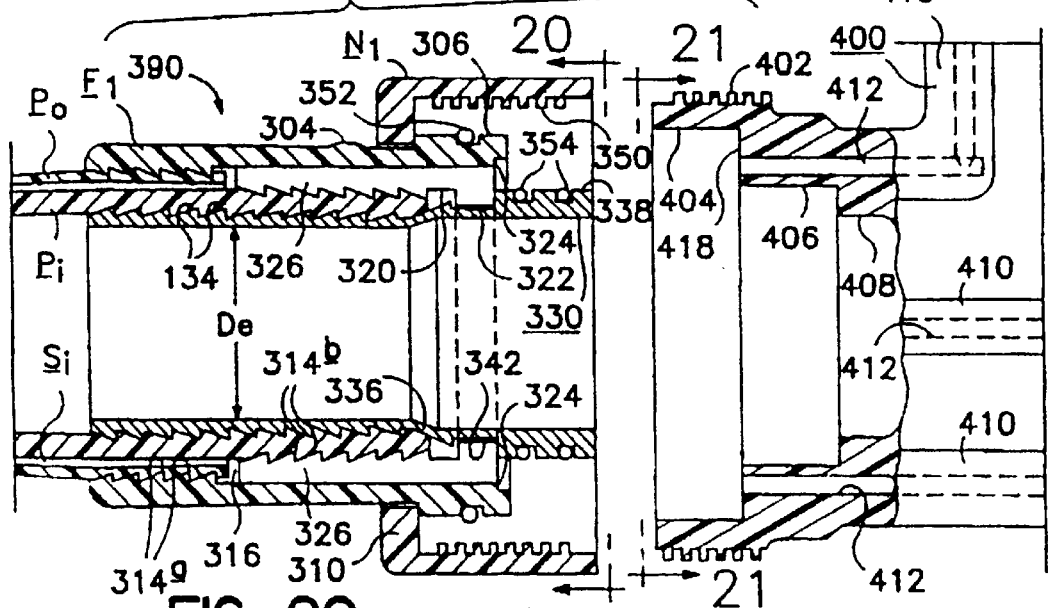
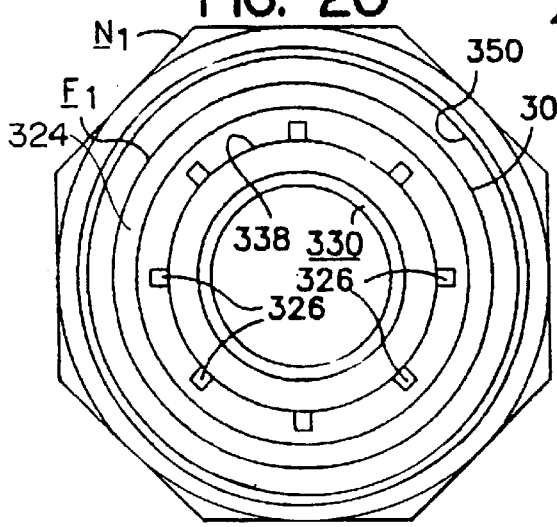
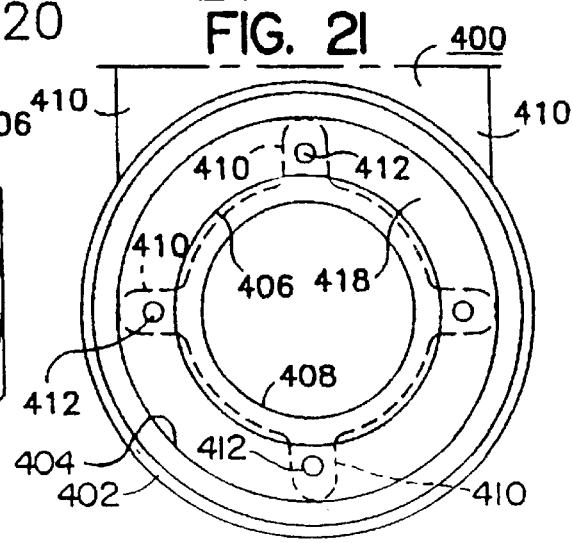

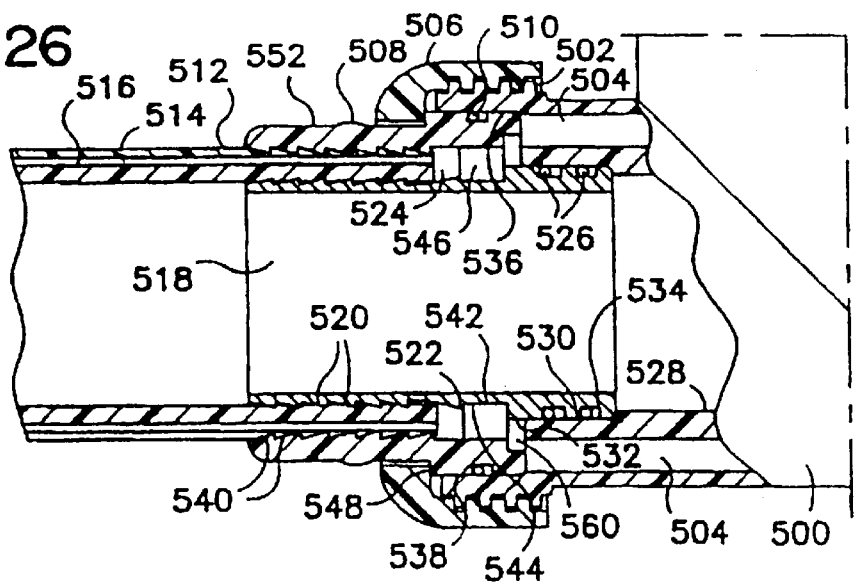

5,831,149

PIPE COUPLING ASSEMBLY, SYSTEM AND METHOD

This application is a continuation-in-part of Ser. No. 08 389,004 filed Feb. 15, 1995 which is a continuation-in-part of Ser. No. 08 320,665 filed on Oct. 11, 1994 which is a continuation-in-part of Ser. No. 08 306,680 filed on Sep. 15, 1994, now abandoned.

FIELD OF THE INVENTION

This invention relates to transition coupling and fitting assemblies for connecting segment of pipes into systems. More particularly, the invention relates to a new system using an assembly for coupling coaxial pipes, such as flexible coaxial pipes, of the type used in environmentally conscious petroleum transfer systems.

BACKGROUND OF THE INVENTION

A fundamental concern in the petroleum products industry relates to underground storage of hazardous fluids in large tanks. As a large tank is installed, it is normally filled first with gasoline, or whatever fluid is intended for its use, before earth is back filled and compacted around the tank so that settling is minimized. The added weight of the liquid assists in locating and anchoring the tank.

Over time, as the tank is emptied and refilled, the buoyancy of the tank changes. Rather than remain in one place as might be expected for a large tank packed into the ground, it has been discovered that the tank can shift. If the surrounding soil is wet or subjected to underground water table pressure, the tank may "float" underground. Even when the tank is prevented from substantial movement, such as when the ground above the tank has been filled and covered with concrete or asphalt, the tank and attachments thereto are subjected to considerable force. This phenomenon is known as "shifting tank syndrome". As a result of the "shifting tank syndrome", pipes, pumps, sumps and risers and all of the various fittings and connections associated with the tank and with the pipe system are subjected to substantial stress. With these stresses comes the risk of failure of the tank and the attachments, especially failure of the joints and connections.

Previously, rigid steel and fiberglass piping was used to connect tanks to pumps and other dispensing units. When the tanks experienced the shifting tank syndrome, there was a risk that pipes would burst, valves fail, fittings break, and sumps crack, thus failing to collect leaking fluids.

In addition to these concerns, the tank, pipes, fittings, sumps and the like were subjected to attack and degradation from the environment. Petroleum products and other hazardous materials are not compatible with many materials, so that transferring fluid from the tank to an above-ground pump subjects the internal portions of the system to potential leaks which could cause damage and degradation over time. An even greater concern is that the external ambient underground environment would have an adverse effect on the system since metal can rust or corrode if not protected. Also, materials such as rubber and plastic can degrade and eventually fail when exposed to certain transfer fluids and the ambient underground environment.

Because the petroleum equipment market is becoming more environmentally conscious, a shift has occurred from the use of rigid underground piping to flexible piping. Rigid piping has a number of drawbacks, including the fact that it must be laid out accurately with precise angles using 90° elbows, 45° elbows and the like, even, when the underground fuel storage tanks and pumps are not properly aligned with respect to each other. A primary reason for this shift from rigid to flexible piping is that flexible piping has fewer pipe connections than rigid systems since the flexible system can accommodate virtually any orientation or alignment of the pumps and tanks. With fewer pipe connections, the piping system is considered more environmentally safe. Movement of the tank due to the shifting tank syndrome also is more easily accommodated by flexible piping.

Flexible underground piping systems have also gained popularity because these systems are more easily installed than rigid piping systems. Rigid systems require on-site measurements and cutting of each piece, along with the intensive labor involved in making two pipe connections every time the piping undergoes a change in direction. Flexible underground piping systems thus can be installed at a lower total cost than conventional rigid piping systems.

As part of the development of underground piping systems, it has been necessary to provide a means of secondary containment for both the primary piping and for the associated fittings in order to provide a margin of safety in case of leaks or damage to the system. The secondary containment pipe protects the primary supply pipe from the ambient environment and from inadvertent damage, and further, provides for a method of containing the fluid from the primary pipe in the event of a rupture or leak of the primary pipe.

Several types of double wall flexible piping systems are known. These include systems which have a small flexible pipe housed in a larger flexible containment pipe. One such system is described in U.S. Pat. No. 4,971,477 (the '477 patent), wherein access chambers are separated by a secondary containment pipe which is sized to accept a primary pipe within the secondary containment pipe. This system, however, has a number of drawbacks, including the fact that the primary and secondary pipes are installed separately and that fittings are required for each of the two types of pipes. Moreover, because each of the pipes connects with an access chamber, a rapid and simple method of monitoring the condition of the primary piping may not be possible. Although the sumps in the '477 patent are capable of being monitored visually by an attendant, but the demand of other tasks to be performed by the attendant eventually leads to fewer and fewer inspections. Most important is that leaks may occur randomly, not only just prior to a visual inspection, and especially when inspections grow less frequent over time.

As taught in the '477 patent, the flexible piping and the secondary containment piping require a sump or access chamber each time that sections of the flexible pipe are joined together. Most other systems also require a sump at each location where sections of flexible pipe are joined together.

Other systems which have met with some degree of success using coaxial pipes and a secondary containment pipe are shown in U.S. Pat. Nos. 5,263,794 (the '794 patent), and 5,297,896 (the '896 patent) the entire disclosures of which are incorporated herein by reference. The advantages of flexible pipe systems are disclosed by these patents. Nevertheless, it is necessary to make individual connections each time sections of pipes are joined together.

The '794 and the '896 patents disclose various definitions that have become standard in the industry, for example, "tanks", "pumps", "dispensers" and the like. Also disclosed therein are descriptions of double wall piping systems which provide secondary containment. In a system that employs secondary containment, a primary pipe carries the petroleum product or other hazardous material from the underground tank to the above-ground dispenser. The primary pipe, also known as the supply pipe, is located inside a larger, outer secondary containment pipe, known also as the containment pipe. Access sumps and other containment components are located around the tank pump, underneath the dispenser and at various junctions of piping.

Various types of double wall piping systems are disclosed in the '896 patent. Among those systems are: (1) a non-flexible fiberglass supply pipe fully contained by a larger non-flexible fiberglass containment piping system; (2) a non-flexible fiberglass or steel supply pipe contained by a combination of larger, flexible and non-flexible polyethylene telescoping containment pipe; (3) a system like the preceding one but with a larger, non-flexible polyethylene telescoping containment pipe; (4) a fiberglass or steel non-flexible supply pipe contained by a flexible membrane trench liner; (5) a system like the preceding one but with a non-flexible fiberglass trench liner; (6) a flexible nylon composite supply pipe contained by a larger flexible polyethylene containment pipe; and (7) a flexible rubber composite supply pipe contained in a larger, flexible polyethylene composite containment pipe.

Some or all of these pipe systems have been utilized. More recently, a significantly more effective system has become available and has met with substantial success in the industry. This more effective pipe system's supply pipe is a flexible double wall pipe comprising an inner pipe and an outer pipe in radial communication with the outside surface of the inner pipe. Most preferred are pipes of this configuration that have internally facing longitudinal ribs on the inner surface of the outer pipe, or externally facing longitudinal ribs on the outer surface of the inner pipe. In either such design, a plurality of circumferentially spaced ribs extend radially from one pipe member to the other pipe member such that the ribs have a surface that confronts and snugly engages the other pipe to define an interstitial space between the two pipes.

The flexible double wall pipe described immediately above is disclosed in my co-pending patent Application entitled Environmentally Safe Underground Piping System, filed Jun. 1, 1993, and having Ser. No. 08/070,271 (the '271 application), the entire disclosure of which is incorporated herein by reference. The co-axial pipes disclosed in the '271 application are normally suited for use with hazardous material transfer pipe systems of the type described herein. The inner most layer is formed from a material such as nylon, polyethylene or the like, which is highly resistant to the hazardous transfer fluid. The outer jacket of the double wall pipe which is exposed to the ambient underground environment is formed from a material such as nylon, polyethylene or the like, which is highly resistant to the ambient underground environment and which does not degrade over time. Between the outer wall of the primary pipe and the inner wall of the containment pipe is an intermediate layer, either in the form of ribs projecting from one surface to the other, or in a standoff layer formed from a cylindrical portion having circumferentially spaced ribs that define the interstitial space between the two pipes. As noted in the '271 application, other layers can be present in the design, such as intermediate layers formed from lower cost materials which do not directly contact either the hazardous material being transported or the ambient underground environment.

Thee environment for both surfaces of the pipe is an important design aspect which needs to be considered. Product components which make up primary or secondary containment systems for hazardous liquids, and in underground applications particularly, must be designed, manufactured and individually tested to insure that they will not fail due to material deterioration. The selection of plastic material used in these components must be capable of withstanding long term exposure to a variety of conditions expected in this type of underground system. Some of the most common conditions to which the pipe would be exposed are contact with petroleum fuels, alcohol blended fuels, brown water, microbial growth, high humidity and heat. For example, if the wrong plastic were selected, the component could fail due to degradation and the contained hazardous liquids could then escape into the environment. For example, the use of primary and secondary containment products made of exposed polyethylene has resulted in failures across the United States with reports of leaking products escaping into the surrounding environment. Some plastics, such as polyethylene and nylon, however, are excellent performers upon exposure to a wide variety of chemicals and conditions, and do not chemically degrade when exposed to these chemicals and conditions. The appropriate plastic material, such as nylon or polyethylene, does not have an adverse reaction to water, micro-organisms, solvents, heat, oxygen, sunlight or burning. Products designed for primary and secondary containment of liquid fuels in underground storage and piping applications may expect to be subjected to at least four of these seven conditions at any given time.

The material employed must be resistant to hydrolysis, as it is expected that water and high moisture conditions will exist in underground burial applications both for contained and non-contained underground piping applications. Resistance to hydrolysis is important since some elastomers suffer an irreversible breakdown when exposed for lengthy periods to hot water, moisture vapor or tropical climates. Resistance of the materials to solvents such as alcohols found in oxygenated fuels and many fuel additives is also important since solvents and fuel additives can be expected to be present in both contained and non-contained underground piping applications. Tests are available to assure that the plastic materials chosen will resist whatever hazardous material, such as a 90% fuel/10% methanol mixture that is being transported. Exposure to micro-organisms also must be expected in both contained and non-contained piping applications because of the existence of high moisture and heat. Temperatures inside tank sumps have been found to exceed 100° F. due to solar heating of the steel manhole covers located just above the tank sumps. In this type of environment, micro-organisms multiply very rapidly and the enzymes released by these micro-organisms can cause breakdown of certain chemical linkages and destruction of some forms of elastomers. Care therefore should be taken to select materials which are nondegradable when contacted by the specific environment in which they are employed.

In addition to the tanks, pumps, pipes and dispensers used in underground piping systems, sumps are used as part of the secondary containment system. One sump surrounds the pump on the tank and another sump is generally positioned below each dispensing system. Sumps typically have a base portion, a riser and a lid and are provided with means for permitting piping to enter and exit the sump. In a typical sump under a dispensing station, a supply pipe and secondary containment pipe enter one side of the sump base to engage a tee fitting. Fuel is then directed upwardly from the tank to the dispensing pump and outwardly through the opposite side of the sump base to the next part of the system. Each time pipes are connected to one another, they are typically enclosed in a sump which, of course, requires an entry port, or so-called boot and an exit boot. Even with the use of flexible piping, a complex underground piping system involves placement of many sumps and other fixtures, all of which are subject to attack by the ambient environment, transfer fluid and to stresses caused by the shifting tank syndrome.

As can readily be appreciated, every pipe must eventually end. It then becomes necessary to connect that end of the pipe to either a pump or to a fitting joining two or more other pipes. Typically the inner, primary supply pipe, is directly connected to fittings and the like, and another primary supply pipe is connected to the other end or ends of the fittings. Merely connecting the inner supply pipes, as in the past, has been no different than connecting a single pipe system. In the evolution of piping systems as discussed above, the relationship of the outer, secondary containment pipe to the system has become more complex.

Initially, non-flexible pipes functioning as a secondary containment pipe were attached to the sump or other chambers by enlarging the hole in the sump to permit entry or exit of the outer pipe from the sump, and later by various fastening and sealing methods and devices. Initially, the interstitial space between the inner and outer pipes served as a conduit for fluid leakage to flow downhill into the next sump in the piping system. Leaks could come from fuel from the inner pipe, or from the outer pipe as ambient environmental liquids, such as water, penetrate the outer pipe.

Leak detection initially consisted of opening the sump chamber and inspecting the bottom of the sump for fluid accumulation. Of course, whatever can be visually inspected can be monitored automatically. Systems were proposed for monitoring the liquid levels in the bottom of sumps. However, every sump had to have a monitoring device since each sump, by design, represented a low point where fluid could collect. The difficulty in such two pipe systems can easily be seen by viewing FIG. 2 of '477 patent where the outer pipe has a very limited, minor function of simply isolating the primary supply pipe from the ambient environment. Also shown in that Figure is the way that the interstitial space between the primary pipe and containment pipe merely opened into the larger sumps without any recognition that there may be other purposes for the interstitial space. As is shown in FIG. 3 of the '477 patent, the secondary containment pipe merely serves as a housing or conduit for sections of the primary supply pipe which may be inserted or removed as desired.

In my co-pending '271 application, I disclosed a connecting boot which substantially improves utilization of the interstitial space. The connecting boot comprises a device which fits onto one terminal end of a supply pipe, allowing the inner primary supply pipe to extend out from the connecting boot while the outer secondary containment pipe terminates inside the connecting boot. The exit end of the boot where the primary supply pipe exits is clamped to, or otherwise sealingly engages, the outer surface of the primary pipe. The entrance end of the boot that fits over the exterior of the secondary containment pipe is also clamped to, or is sealingly engaged with, the outer pipe surface. In between these two sealed ends of the boot is a chamber which communicates with the interstitial spaces of the two pipes and also communicates with a radially extending port. An elbow fitting and tube is usually provided which can be connected to the radially extending port and elbow fitting on the adjacent pipe, to which the primary pipe has been attached in a conventional manner. Thus, for the first time, it is possible to connect not only the interstitial spaces of two adjacent pipes but the interstitial spaces of an entire system which are connected to a single monitoring device. The entire interstitial space of all of the piping is then filled with a liquid to a level which registers in a predetermined range of the monitoring device to indicate a securely contained system. When the level of the fluid in the interstitial space either drops below a certain amount or rises above a certain amount, indicating a change in the system, an alarm will sound.

The test boot, as the boot of '271 application is called, has provided a substantial advance in the hazardous fluid piping system industry, primarily by permitting interconnection of all of the system wide interstitial spaces. The test boot, however, is not as structurally solid as an access sump, for example, and thus needs to be enclosed in a sump for protection. Even then, over time, it is probable that the test boot may leak and defeat the purpose of system wide interconnected interstitial spaces. Even with the greatest care in selecting the material from which the test boot is constructed and with substantial attention to the assembly of the test boot, the shifting tank syndrome and other stresses can eventually weaken the boot, requiring that it be replaced or at least inspected on a regular, periodic basis.

All of the secondarily contained piping systems, access sumps and other equipment described above have been developed over a short period of time in response to a continuously changing industry where environmental and safety regulations are becoming more strict. As these developments occur, various manufacturers and other organizations have developed their own design criteria in response to the concerns which they have. Accordingly, none of the systems described above is truly effective in resolving the environmental issues while maintaining an efficient and effective fluid transfer piping system.

There are several additional considerations that need to be addressed in designing of the connections between sections of pipes, particularly between sections of flexible coaxial pipes. First, it is desirable to avoid plastic to plastic connections, since vibration and time will cause flow of the plastic material so that an effective connection is not always secured. A much better seal is achieved when metal and plastic are joined together since the metal does not melt or flow and the plastic tends to accommodate itself to the metal. However, in such cases it is necessary to protect the metal from the environment by a coating to avoid a corrosive and unsafe condition. Coatings on metal parts, however, often peel off or become damaged during handling of the metal parts. Also, if the coatings are too thick, the necessary metal to plastic contact to establish an effective seal is not achieved.

As will be apparent from reviewing the above patents, there is an interstitial space between the inner primary supply pipe and the outer secondary containment pipe. This interstitial space has been used to transfer leaked fluid into the containment sump or access chamber. Typically, in early systems, the access chambers were inspected on a regular basis to see if quantities of fluid had collected. This, of course, does not provide a rapid response to a major leak of fluid such as fuel from the primary supply pipe.

As shown in the '794 and the '876 patents, the entire system is connected such that the primary pipe functions as a closed system, transporting fuel from the supply tank to the various dispensers. However, the interstitial space between the primary supply pipe and the secondary containment pipe is, at least in '477 patent, merely a conduit allowing leaked fluid to flow to an access chamber for observation. Although it is possible to monitor the conditions of one or all of the access chambers, for example by visual inspection, no simple method of monitoring the entire system is possible.

Accordingly, a principal object of the present invention is to provide an underground piping system which employs coaxial pipe, such as those pipes described above, which include a primary supply pipe and a secondary containment pipe, in which the interstitial space between the two pipes can be connected to the interstitial spaces in other segments of piping to form a continuous closed system of interstitial space.

Another object of the present invention is to provide a coupling assembly for use with coaxial pipes which permits coupling of the interstitial space between the coaxial pipes with corresponding interstitial spaces in other segments of pipe.

Still another object of this invention is to provide a coupling assembly which facilitates connection of a plurality of coaxial pipes without the use of containment chambers or sumps.

Yet another object of this invention is to provide a coupling assembly in which sealing between the pipes is accomplished by a plastic on metal seal in a manner that protects the metal portion of the seal from exposure to the environment so that the coupling assembly will operate effectively underground without additional protection from sumps and the like.

An additional object of this invention is to provide an effective monitoring system utilizing the interconnected interstitial space of the coupling assembly, particularly with the use of vacuum applied to the interstitial space.

Finally, it is an object of this invention to provide an underground piping system that can be directly buried in the ground without the need for sump devices at every junction of pipes or fittings and without the need for separate secondary containment of any type.

Other objects will appear hereinafter.

SUMMARY OF THE INVENTION

It has now been discovered that the above and other objects of the present invention may be accomplished in the following the manner. Specifically, an improved pipe coupling assembly has been discovered which permits junction of a variety of pipe segments, particularly those having an inner wall, an outer wall and an interstitial space between those walls. The pipe coupling assembly attaches to these pipe segments at the coupling end of the pipe segments and thereby defines a direction of flow from the pipe segments to the next part of the system. A system for transporting hazardous fluids in a piping system such as an underground piping system has also been discovered that provides many improved features. An improved coupling assembly, system and method are also provided for joining flexible co-axial pipe segments and their fittings.

The present invention provides various advantages. The coupling assemblies of the present invention have a double wall design and provide for transition of interstitial spaces in ways which have previously not been possible. Sealing is extremely effective, employing a double 0-ring seal and a mechanically locked seal, or alternatively, radial seals. The mechanical closure further has a back-off restrictor locking lug device that prevents vibrations from causing back-off of the mechanically locked seal. The components of the present invention are formed from non-permeable, nondegradable plastic materials such as nylon and polyethylene, and all metallic parts are protected from the external ambient underground environment of the piping system. The coupling portion of the present invention effectively seals the inner tubular member and the outer tubular member simultaneously. Riser pipes formed from steel and other metals may be secondarily contained and dielectrically isolated from the environment.

One major advantage of the present invention is that it permits the interstitial space of the entire piping system to be interconnected into one closed system. Thus, the interconnected interstitial space can be subjected to pressurized air, preferably, pressurized nitrogen, to test the entire system at one time. Moreover, liquid or gas interstitial monitoring is readily obtained using the present invention. A most important advantage of the present invention is that all couplings, fittings and connectors are non-metallic and nondegradable so that they may be buried directly in the ground without the need for additional protection.

The present invention provides a number of benefits. Installation is much faster and more efficient, and the system does not corrode. The system can be directly buried in the soil, eliminating the need for costly containment chambers because the fittings, couplings and adapters can be made of a impermeable plastic that prevents long term contamination of the surroundings. Additionally, the pipe coupling assembly, system and method are capable of withstanding stress from movement of the system as tanks are filled and emptied and as water tables affect the components of the system.

The present invention is suited for long term secondary containment of hazardous fluids which are transferred in underground systems. In terms of monitoring of the interstitial space, the present invention provides a totally contained, interconnected, interstitial space which is capable of withstanding high internal pressures, in part because test boots have been eliminated. Further, the system can be used either alone or in conjunction with known fluid detection systems.

The coupling assembly includes a ferrule attached to the outer wall of the pipe segment at the coupling end. The ferrule has an outer annular ring extending from the coupling end of the pipe segment in the axial direction of flow. The ferrule also has a pocket which aligns with the interstitial space of the pipe segment to define and present a chamber at the coupling end for communication with the other pipe segment interstitial regions via channels in the ferrule.

The coupling assembly further includes an insert, preferably made of metal, which is attached to the inner wall of the pipe segment at its coupling end. The insert, which is expanded into the inner tubular member wall, includes an inner annular ring extending from the coupling end of the pipe segment in the direction of fluid flow.

The second component of the coupling assembly is an externally threaded transition fitting which can be attached to the ferrule. The transition fitting includes a channel which is aligned with the chamber of the ferrule. The transition fitting further includes an outer seal channel for sealing engagement with the outer annular ring on the ferrule. The transition fitting still further includes an inner seal channel for sealing engagement with the inner annular ring on the metal insert. By bringing the transition fitting into contact with the ferrule and metal insert, a metal to plastic seal is achieved. Moreover, the interstitial space from the pipe segment through the ferrule to the transition fitting is effectively sealed by interaction of the annular rings and the sealed chambers. A final component of the coupling assembly is a coupling device for locking the coupling assembly, such as a swivel nut, which is keyed to the ferrule to prevent removal in the axial flow direction, although it is removable in the direction opposite the axial flow.

The invention also provides a system as well as a method in which an underground source of liquid or fluid is connected to at least one dispenser for the fluid by a double wall coaxial pipe having an interstitial space, with the connection being accomplished using the coupling assembly described alone. A direct burial system is possible for the first time, using the present invention in its preferred embodiment.

The integrity of the system is tested by applying pressure or vacuum to the interconnected interstitial spaces of the pipe segments which have been formed into a closed system. If the pressure or vacuum does not hold over a reasonable period of time, the system likely has one or more fluid leaks. The fittings and other components can then be inspected to locate leaks. Moreover, after the entire system has been operating, the interstitial space may again be subjected to pressure or vacuum to test for leaks. If, for example, a vacuum is lost sooner than a predetermined period of time or takes more than a predetermined time to achieve a given vacuum, this will indicate that a leak is present. Also, a liquid detector in the vacuum system would alert the user to a leak.

It is also possible in accordance with the invention to continuously monitor the interstitial space. To do so, a test fluid is added to the interstitial space of the closed system to fill the entire interstitial space. This test fluid is then monitored, either visually or automatically, so that a sudden or gradual change in the amount of test fluid in the interstitial space indicates that the system has failed and that a leak exists. For example, if the inner tubular member were damaged, substantial increase in fluid in the interstitial space would occur, causing the fluid level in the monitoring device to rise. Similarly, if the outer tubular member were damaged, the test fluid would leak into the ambient environment and the fluid level in the monitoring device would drop indicating a break in the system. In all cases, controls are provided to override any pumps in operation at the time to shut down the system.

BRIEF DESCRIPTION OF THE DRAWINGS

These and other objects of the present invention of the various details of the operation and construction thereof are hereinafter more fully set forth with reference to the accompanying drawings, wherein:

FIG. 2 is a an enlarged fragmentary sectional, elevational view of the detail contained in the dot and dash box of FIG. 1 designated as FIG. 2 showing the details of a coupling in accordance with the present invention connecting a pipe riser to the underground piping system;

FIG. 3 is an enlarged sectional view taken along the lines of 3—3 of FIG. 2 showing details of the transition coupling in accordance with the present invention;

FIG. 4. is an enlarged sectional view taken along the lines 4—4 of FIG. 2 showing the interstitial spaces or channels in the co-axial piping segments;

FIG. 6 is an enlarged fragmentary sectional view of the details contained within the dot and dash box of FIG. 5 and designated FIG. 6 of the transition coupling and a portion of the tee fitting;

FIG. 7 is an exploded sectional view similar to FIG. 6, prior to assembly of the transition coupling to the transition tee fitting;

FIG. 8 is a view taken on lines 8—8 of FIG. 7, showing the axial end face of the transition coupling;

FIG. 9 is a view taken on lines 9—9 of FIG. 7, showing the axial end face configuration of the transition tee fitting;

FIG. 10 is a sectional view taken on lines 10—10 of FIG. 7;

FIG. 11 is an enlarged fragmentary elevational view of the details contained within the dot and dash box of FIG. 1 and designated as FIG. 11 with parts broken away to show the construction of the various elements including an embodiment of transition coupling and transition fitting in accordance with the present invention;

FIG. 12 is a sectional plan view taken on lines 12—12 of FIG. 11;

FIGS. 13A, 13B and 13C, are various elements or components of a transition coupling in accordance with the present invention;

FIG. 13D is a transition tee fitting in accordance with the present invention;

FIG. 13E is a side, elevational view of a transition elbow fitting in accordance with the present invention;

FIG. 13F is a side, elevational view of a connector fitting in accordance with the present invention;

FIGS. 13G and 13H are female and male adapters;

FIG. 13I is an exploded view of a shear valve adapter;

FIG. 13J is an exploded view of the elements comprising a riser adapter;

FIG. 14 is an exploded view of parts shown in sections of the elements of the transition coupling prior to assembly to a co-axial pipe segment;

FIG. 15 is a sectional view showing the transition coupling prior to expansion of the coupling insert to secure the transition coupling to the co-axial pipe section;

FIG. 16 is a view similar to FIG. 15 after outward swaging of the coupling insert;

FIG. 18 is a fragmentary elevational view, with a portion broken away and in section; similar to FIG. 6, but showing a second embodiment of a coupling assembly of the invention joined to a transition fitting.

FIG. 19 is an exploded fragmentary elevational view showing a second embodiment of the modified coupling assembly prior to connecting to a transition fitting.

FIG. 20 is an end view of the second embodiment of the coupling assembly, as viewed from the line 20,20 of FIG. 19.

FIG. 21 is an end elevational view of the transition fitting as viewed from the line 21,21 of FIG. 19.

FIG. 26 is a cross-sectional assembly view of an additional embodiment of the transition coupling assembly included in the transition fitting showing connection with an coaxial pipe.

FIG. 27 is an exploded view of FIG. 26 showing the coupling assembly having a pipe and a transition fitting.

FIG. 28 is an end view of the coupling assembly shown in FIG. 27.

FIG. 29 is an end view of the transition fitting shown in FIG. 27.

DETAILED DESCRIPTION OF THE PREFERRED EMBODIMENT

Figure 1:
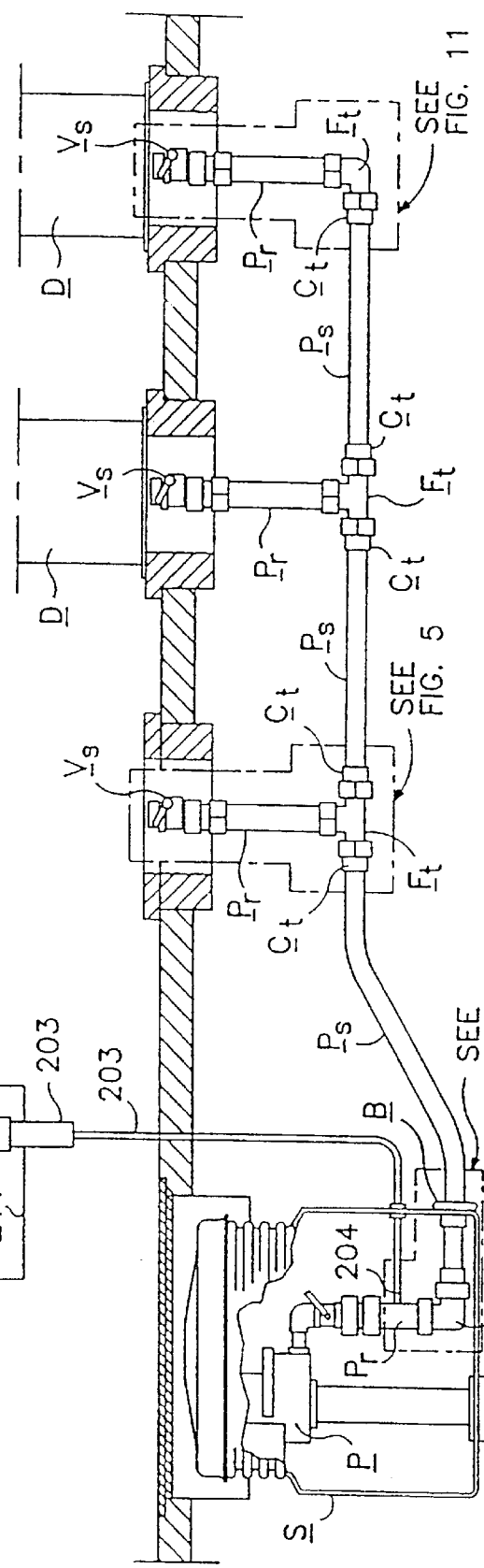
FIG. 1 is a schematic illustration of an underground piping system for delivering petroleum products from an underground supply tank to dispensing units incorporating a coupling system in accordance with the present invention.

Referring now to the drawings and particularly to FIG. 1 thereof, there is shown schematically an underground piping system for conveying petroleum products from an underground storage tank to a plurality of above-ground dispensing pumps. The piping system incorporates a novel coupling means in accordance with the present invention. The pipe coupling assembly of the present invention is particularly adapted for interconnecting the interstitial regions in the piping to provide a closed, continuous monitoring system for detecting leaks that provides advantages over prior art piping systems used for this purpose.

As best illustrated in FIG. 1, the basic elements of a piping system include a storage tank T for containing a large quantity of a petroleum product, connected to a pump P housed in a sump S. As shown in FIG. 2, pipe segment $P_s$ extends through a hole in the wall of the sump S, and is flexibly mounted in a flexible entry boot assembly B. Pump P is connected to a piping system comprising a plurality of interconnected pipe segments $P_s$ and pipe risers $P_r$ to conventional product dispensers D located above ground. Shear valves $V_s$ are located in predetermined locations in the piping system to provide a means for shutting down delivery of petroleum products under certain operating conditions.

A monitoring system broadly designated M is provided for detecting leaks in the underground piping system. The monitoring system essentially detects variation in the pressure of the interstitial spaces which are connected in a manner to define one closed circuit or path. The system provides early warning of leaks in the underground piping system and thereby to minimize chances of contaminating the underground environment.

The pipe segments $P_s$ are preferably co-axial pipes of the type shown and described in my co-pending application entitled Environmentally Safe Underground Piping System, filed Jun. 1, 1993, Ser. No. 08/070,217, (the '217 application) and commercially available from Environ Products, Inc., Lionville, Pa. (USA) under the trademark GEOFLEX™. Pipe segment $P_s$ comprises an inner tubular member $P_i$ made of a nondegradable or inert material, such as nylon or polyethylene, with respect to the petroleum products being handled in the piping system and an outer tubular member $P_o$ made of a nondegradable or inert material, such as nylon or polyethylene when exposed to the ambient environment and thus is suitable for direct burial applications. The co-axial pipe also has a series of circumferentially spaced longitudinally extending ribs defining a series of longitudinal interstitial spaces or passageways $S_i$ extending from end to end in the pipe segments $P_s$. Even though the present invention is shown and described in association with co-axial GEOFLEX™ pipe of the type described, the invention has application in other piping systems utilizing pipes having different or larger interstitial spaces between the elements of each piping section such as, for example, the space between a primary pipe housed in a secondary containment pipe as shown in the '477 patent. Further, even though the interstitial space $S_i$ in the pipe illustrated and described herein is defined by longitudinally extending ribs, it is to be understood that the interstitial space can be defined by other means such as axially aligned spacing members or helically wound spacing members as long as the interstitial space is continuous and provides a continuous fluid flow channel between the ends of the pipe segments $P_s$.

The coupling assemblies of the present invention incorporate novel structure and means for connecting the pipe segments $P_s$ to facilitate monitoring of all of the elements of the underground piping system, including the coupling assemblies, utilizing a minimum number of parts which are easy and economical to assemble and are capable of direct burial applications without the need for utilizing additional secondary containments. To this end, the coupling assemblies incorporate novel arrangements of internal channels connecting the interstitial spaces $S_i$ of the pipe segments $P_s$ to one another in a closed circuit. The arrangement provides very precise and accurate monitoring which is capable of detecting leaks in the underground piping system.

The coupling assemblies comprise a transition coupling $C_t$ assembled to terminal ends of the pipe segments $P_s$ and a transition fitting $F_t$ in the form of tee fittings or elbow fittings to which the transition couplings $C_t$ can be readily assembled. Transition couplings $C_t$ and transition fittings $F_t$ having a novel arrangement of passageways and internal channels to fluidly link the interstitial spaces $S_i$ of the pipe segments $P_s$ in the manner described in more detail hereinafter. Transition couplings $C_t$ and transition fittings $F_t$ are also characterized by novel features of construction and arrangement providing simple and effective sealing of the elements relative to one another, easy and quick application to pipe segments and assembly together at an underground site, and providing exceptional shear strength for resisting possible failure when relative movements occur in the underground piping system due to settling or shifting of various components of the system such as the supply tank T or other components by the shifting tank syndrome.

Considering broadly the basic components of a coupling assembly in accordance with the present invention, the assembly comprises a transition coupling $C_t$ mounted on the terminal end of pipe segment $P_s$ having a metal insert, a ferrule F circumscribing the outer peripheral surface of the outer tubular member $P_o$ of the pipe segment $P_s$, and a swivel nut N for securing transition coupling $C_t$ to a transition fitting $F_t$. The components of transition coupling $C_t$ and transition fitting $F_t$ which are exposed to the ambient environment are preferably made of a nondegradable material such as nylon or polyethylene, more preferably of glass filled plastic such as Celstran available from Polymer Composites Co., Inc., Winona, Minn. (USA). Transition coupling $C_t$ and transition fitting $F_t$ are provided with internal channels or passageways, ports, and chambers to provide a direct fluid communication between interstitial space $S_i$ of pipe segments $P_s$ which are connected together by the coupling assemblies to provide a continuous interstitial space within the piping system. This enables the components of the underground piping system to be monitored for leakage.

Considering now more specifically the structural detail and arrangement of a coupling assembly in accordance with the present invention, and considering first the details of transition coupling $C_t$, transition coupling $C_t$ comprises an elongated hollow tubular sleeve member 30 engaging interiorly of inner tubular member $P_i$ of pipe segment $P_s$ which, as illustrated in FIG. 15, is initially of an outer diameter $D_o$ less than inner diameter $D_i$ of inner tubular member $P_i$ to freely engage therein. Sleeve member 30 is preferably made of a metal such as stainless steel and other alloys which are deformable by a swaging operation to seat and firmly engage transition coupling $C_t$ to the end of pipe segments $P_s$ in a manner described in more detail below. Hollow tubular sleeve member 30, as shown in FIG. 14, has a series of circumferentially extending axially spaced, beveled ribs 32 formed on its outer periphery defining teeth 34. Each tooth 34 has a rearwardly and outwardly beveled face 36. By this arrangement, when sleeve 30 is expanded radially outwardly by swaging, teeth 34 engage into the inner peripheral surface of inner tubular member $P_i$ in the manner shown in FIG. 16, and sleeve 30 is firmly locked in place once assembled. Additionally, even if sleeve 30 initially fits the inner peripheral surface rather snugly, the direction of beveled faces 36 is such that sleeve 30 may be pushed into place easily.

As shown in FIG. 14, the inner end of sleeve 30 has an offset, frusto conical outwardly directed wall 40 terminating in a short, axially directed circumferentially extending sealing flange 42. Locating rib 44 projects radially outwardly from the outer surface of sleeve 30. Locating rib 44 engages the outer axial end face of inner tubular member $P_i$ of pipe segments $P_s$ to locate transition coupling $C_t$ in position relative to pipe segments $P_s$ to properly align a manifold in ferrule F relative to the axial ends of interstitial spaces $S_i$ in pipe segments $P_s$ in a manner to be described in more detail below.

Rib 44 and frusto conical wall 40 define a circumferentially extending locating groove 46 defining a seat for a locating rib or flange on ferrule F which aligns ferrule F and sleeve 30 in a pre-determined axial alignment relative to one another to be described in more detailed hereinafter wherein the assembly of these components to transition fitting $F_t$ are set forth.

Consider now more specifically the structural details of ferrule F. As best illustrated in FIGS. 7 and 14, ferrule F comprises an elongated hollow tubular sleeve member 50 having a series of circumferentially extending axially spaced inwardly beveled ribs 52 formed on its inner periphery defining teeth 54 for locking engagement with the outer peripheral surface of the pipe segments $P_s$. Each tooth 54 has a beveled rearwardly directed face 58 permitting easy application of ferrule F over the outer peripheral surface of pipe segments $P_s$ in one direction, an assembly direction, and, when fully assembled as shown in FIG. 16, resists axial displacement of ferrule F to firmly lock ferrule F in place in the assembled position.

The inner surface of ferrule F as illustrated has a stepped configuration defining an inner section of teeth 54a having a predetermined diameter $D_5$ and a rearward section of teeth 54b having a smaller diameter $D_6$ to snugly embrace the outer peripheral surface of inner tubular member $P_i$ of pipe segment $P_s$. Ferrule F has a circumferentially extending groove 60 at the juncture of teeth segments 54a and 54b and a plurality of circumferentially spaced axial passageways 62 extending from groove 60 to the inner axial end face of ferrule F, groove 60 defining an annular manifold or chamber C in the assembled relation, as shown in FIGS. 7 and 15, communicating with interstitial spaces $S_i$ of pipe segment $P_s$ to provide a direct fluid communication from interstitial spaces $S_i$ through ferrule F.

A circumferentially extending radially inwardly directed rib 64 is provided on the inner end of the ferrule F which engages locking groove 46 of sleeve 30 to align sleeve 30 and ferrule F relative to one another and to locate it in the desired position on the axial end of a pipe segment $P_s$ in a manner described in more detail below.

Ferrule F also includes a rearwardly directed circumferentially extending lip 70 disposed radially outwardly of axial passageways 62 which overlies and is concentric to the inner flange 42 of sleeve 30 to define pocket 68 therebetween.

Swivel nut N, as illustrated in FIG. 6, has spiral threads 72 formed therein which interengage and mate with spiral threads 73 on transition fitting $F_t$ to secure the coupling elements in place in a manner shown in FIG. 6. Swivel nut N has an opening 74 in its outer one end to freely fit over ferrule F. The opening 74 is spaced inwardly from side wall or skirt 76 to define a circumferentially extending shoulder 78 which abuts an outwardly directed lug 80 on ferrule F to hold the parts of transition coupling $C_t$ in place in the manner shown in FIG. 6 when swivel nut N is threaded onto the transition tee fitting in the manner shown.

Figure 17:
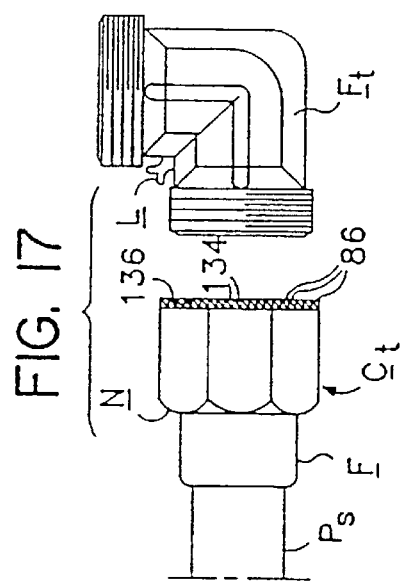
FIG. 17 is an exploded side elevational view showing a slightly modified transition coupling and associated pipe disengaged from a slightly modified elbow fitting, the modifications consisting of a circumferentially extending equally spaced anti-rotation saw teeth on the terminal end face of the swivel nut and a tang projection on the fitting that interengages with the saw teeth of the coupling, allowing free rotation in one direction only.

As shown in FIG. 17, inner axial end face 84 of swivel nut N may be provided with a series of rachet teeth 86 which cooperate with locking lug L on transition fitting $F_t$ when the parts are fully seated to lock the parts of the coupling in the assembled relation.

Figure 5:
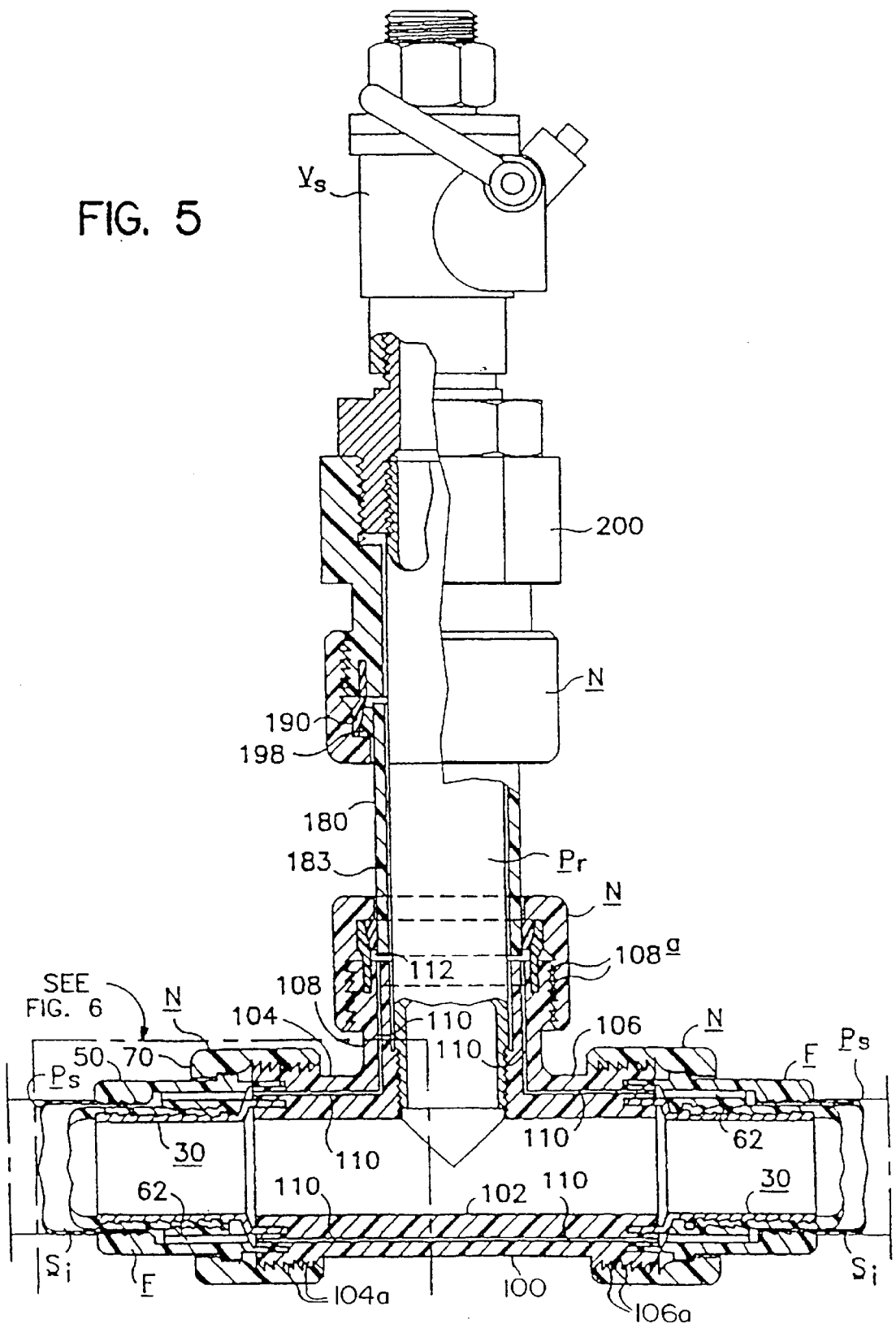
FIG. 5 is an enlarged fragmentary sectional, elevational view of the detail contained within the dot and dash box of FIG. 1 and designated FIG. 5 showing details of the transition coupling and the transition fitting.

There are various types of transition fittings $F_t$. Consider first the transition tee fitting $F_t$ generally designated by the numeral 100 adapted for connecting pipe segments $P_s$ in a piping system such as an underground piping system to one another and to pipe riser $P_r$ in the manner illustrated, for example, in FIG. 5. Tee fitting 100 comprises a T-shaped hollow body 102 having a pair of horizontally aligned legs 104 and 106 and a vertically disposed leg 108. The outer terminal ends of the legs are provided with spiral threads 104a, 106a and 108a respectively, cooperatively engagable by swivel nut N to secure the elements of the coupling in the manner illustrated. A plurality of through ports or channels 110, in the present instance four (4), is provided in the body portion of tee fitting 100 which extend between opposing axial end faces 104b and 106b of horizontal legs 104 and 106 of tee fitting 100. A plurality of through ports or channels 112 are also provided in body 100 of the tee fitting which extend from the axial end faces of the horizontal legs 104 and 106 of tee fitting 100 to axial end face 108b of vertical leg 108. In the present instance, through ports or channels 110 and 112 are disposed on a circular trace $C_1$ having generally the same diameter as axial passageways 62 in ferrule F so that they are generally axially aligned in the same plane in the assembled relation as shown in FIG. 5. This relationship is also true of through ports or channels 112.

As best shown in FIG. 7, a pair of radially spaced, circumferentially extending pockets 120 and 122 are formed in opposing axial end faces of horizontal legs 104 and 106 of tee fitting 100 which straddle through ports or channels 110 and 112. Flanges 42 and 70 of transition coupling $C_t$ engage pockets 120 and 122 when the coupling assembly is assembled. O-rings 124 and 126 are mounted in pockets 120 and 122, respectively, to provide a tight, sealing engagement of these parts to resist leakage from the interstitial region to thereby enable highly accurate monitoring in the manner described herein.

In the present instance, the peripheral wall of vertical leg 108 of tee fitting 100 is threaded to facilitate assembly of pipe riser $P_r$. Vertical leg 108 is also provided with external screw threads to accommodate a modified form of swivel nut N and a suitable seal forming part of the connection to pipe riser $P_r$.

Consider now the assembly of a co-axial pipe $P_s$ in a piping system of the type shown to horizontal legs 104 and 106 of tee fitting 100. Outer tubular member $P_o$ of pipe segment $P_s$ is prepared to receive transition coupling $C_t$ by trimming outer tubular member $P_o$ to expose a portion of inner tubular member $P_i$ at its axial end. The axial length L is predetermined so that when pipe segment $P_s$ is inserted into the annular space between ferrule F and insert sleeve 30, the inner edge of axial passageway 62 is generally aligned with the axial end face of the trimmed outer tubular member $P_o$ to provide circumferentially extending alignment of groove 60 with interstitial spaces or channels $S_i$ at one end of pipe segment $P_s$. It is noted that when pipe segment $P_s$ is positioned between ferrule F and sleeve 30, the axial end of inner tubular member $P_i$ abuts locating rib 44 on sleeve 30 to position manifold or groove 60 in the manner described (see FIG. 15). In this position, swaging tool 130 is pulled through sleeve 30 to press it radially outwardly so that confronting teeth 54a and 54b on ferrule F and teeth 34 of sleeve 30 penetrate inner and outer tubular members $P_i$ and $P_o$ of pipe segments $P_s$ to firmly lock the parts in place. Circumferentially extending flanges 42 and 70 of ferrule F and sleeve 30 are then aligned with circumferentially extending pockets 120 and 122 in the axial end face of horizontal legs 104 and 106 of tee fitting 100 and pressed axially to seat in respective pockets 120 and 122. Swivel nut N is then rotated in a locking direction to fully seat flanges 42 and 70 in pockets 120 and 122, respectively, against O-rings 124 and 126, respectively. In the fully assembled position shown in FIG. 6, a circumferentially extending chamber 132 is formed at the juncture of axial passageway channels 62 in ferrule F and circumferentially spaced transition channels 110 and 112 in tee fitting 100 to ensure fluid communication between interstitial spaces $S_i$ of pipe segments $P_s$ through transition coupling $C_t$ and transition tee fitting 100.

During application of transition coupling $C_t$ to transition fitting $F_t$, in this case, an elbow (See FIG. 17), back-off locking restrictor locking lug L rides on cam faces 134 on the peripheral surface of inner axial end face 84 of swivel nut N and engages behind shoulder 136 to lock transition coupling $C_t$ in place relative to transition fitting $F_t$ when fully seated. It is noted that interengaging threads 72 of swivel nut N and those on tee fitting 100 are preferably large threads to facilitate easy turning of swivel nut N by hand, which is recommended to initially seat the parts. When fully seated by hand, it is recommended to apply no more than a quarter turn with a conventional wrench to fully seat the parts.

As noted previously, the parts are relatively easy and quick to assembly and provide a good seal, ensuring fluid communication between interstitial spaces $S_i$ in pipe segments $P_s$ in the system and a coupling assembly which is able to withstand high shear forces. This is an important consideration in underground piping systems where flexibility and relative movements of the parts are needed to accommodate changing underground conditions due to shifting tank syndrome as described previously.

There is shown in FIGS. 10–12, another embodiment of a coupling assembly of the present invention for connecting various elements of an underground piping system. The coupling assembly comprises transition coupling $C_t$ and transition fitting $F_t$ in accordance with the present invention. Transition coupling $C_t$ is identical to that described previously, and accordingly, the same reference numerals used previously are employed. However, in the present embodiment, transition fitting $F_t$ is an elbow fitting, generally designated by numeral 150, adapted for use in connecting pipe segment $P_s$ to pipe riser $P_r$ at the last station in the system in the manner illustrated in FIG. 1. Elbow fitting 150 comprises a generally hollow body portion 152 having generally right angularly disposed leg portions 154 and 156. Each of leg portions 154, 156 have external screw threads 158 and 160 for receiving swivel nut N type fasteners of the type described previously. Leg portion 156 is internally threaded so that pipe riser $P_r$ can be threadedly connected to elbow 150 as shown.

Ports or connecting channels 164 are provided in elbow fitting 150 which, as illustrated, extend between axial end faces of right angularly disposed legs 154 and 156 of the fitting. In the present instance, body portion 152 of elbow fitting 150 is generally of a tubular configuration and through ports or channels 164 are provided between radially outwardly directed flanges 166 and 168 formed integrally in the outer peripheral surface of body portion 152. As illustrated in FIG. 10, there are four circumferentially equally spaced webs 166 for through ports or channels 164.

Axial end face of leg portion 154 is provided with a pair of radially spaced circumferentially extending pockets 170 and 172 for receiving flanges 42 and 70 of insert sleeve 30 and ferrule F, respectively. As described previously, O-rings 124 and 126 are mounted in pockets 170 and 172, respectively to provide a good seal when connected to a pipe segment $P_s$ in the manner described previously.

FIG. 11 shows the details of a system for monitoring the system by pipe riser $P_r$ by fluidly connecting $P_r$ to the closed network linking interstitial spaces $S_i$ of pipe segments $P_s$ as well as the ports, channels and passageways interconnecting interstitial spaces $S_i$ of pipe segments $P_s$ with one another through transition couplings $C_t$ and transition fittings $F_t$ of the present invention. Thus, a tubular jacket 180 is provided which circumscribes pipe riser $P_r$. Jacket 180 has a plurality of circumferentially spaced radially inwardly directed longitudinal ribs 182 defining channels 183 between tubular jacket 180 and pipe riser $P_r$. As illustrated in FIG. 11, channels 183 are in fluid communication with through ports or channels 164 in elbow fitting 150, and the juncture or transition area 168 of ports and channels 183 are sealed by sealing collar 190 having a circumferentially extending lip 192 which engages in a circumferentially extending pocket 194 formed in the axial end face of elbow fitting 150 located radially outwardly of the through ports or channels 168 in the manner shown. Sealing collar 190 has a frusto conical inner face 196 which engages wedge 198 thereby providing a tight seal in the area between the outer peripheral surface of tubular jacket 180. Modified swivel nut $N_m$ interengages the parts as shown in FIG. 11.

A shear valve adapter broadly designated by numeral 200 connects the upper end of pipe riser $P_r$ to shear valve $V_s$ in the manner illustrated. Sealing collar 190, wedge 198 and modified swivel nut $N_m$ provide a tight seal at the upper end of tubular jacket 180 to shear valve adapter 200. Shear valve adapter 200 may be provided with a test port, not shown, for communicating with the interstitial region between the shear valve adapter 200 and pipe riser $P_r$. This provides a means for checking the integrity of the interstitial region immediately after installation of the underground piping system and periodically thereafter as desired.

Pipe riser $P_r$ connecting the vertical legs of tee fittings 100 to shear valves $V_s$ in the other parts of the system, and pipe riser $P_r$ connecting pump P to first pipe segment $P_s$ in sump S are likewise provided with monitoring means as described above, including jacket 180 and shear valve adapter 200.

Shown in FIG. 1 is a device for testing the integrity of the primary pipe segments and the transition fittings in a totally closed system. The test assembly, shown generally by reference number 201, includes an alarm system and level sensing system. Tube 203 extends vertically to orient an observation tube 205 with respect to a fixed point in space. Tube 203, as shown in FIG. 2, attaches to fitting 204 via elbow 206 for direct connection to interstitial space $S_i$ in riser pipe $P_r$. Monitoring device 201 can be placed anywhere, but it is preferred to locate the monitoring device in the station proximate the control panel or at other places of convenient access to the operator of the station. Alternatively, of course, the monitoring system can be placed in the primary sump or in any other location as desired.

As shown in FIG. 1, the level of test liquid 207 in observation tube 205 is adjusted so that during normal operation it is below sensor 209. Sensor 209 is connected by fiber optic cable 211 to control box 213. Control box 213 includes an indicator light 215 and electrical lines 217 for connection to at least the primary pump for the system so that pumping can be shut down during an emergency. Control box 213 contains conventional processing equipment as well as the alarm and shut down circuitry.

Also provided are sensors 219 and 221 which are positioned below the level 207 of the liquid in observation tube 205. If the system begins to leak, the liquid level 207 will drop below middle sensor 219. At this point, a signal will be generated in the same manner when liquid level 207 exceeds sensor 209, and fiber optic cable 211 will transmit that signal to control box 213. An alarm will be generated, but the system will not be shut down since test liquid passing sensor 219, but not passing sensor 221, indicates that the leak is a slow leak. However, if test liquid level 207 passes sensor 221 as well, which would be the case if a rapid leak were occurring, the alarm would sound and system shut down would occur to prevent or slow further leakage. Because the fluid being pumped is under pressure greater than the pressure of the liquid in interstitial space $S_i$ and thus in observation tube 205, a rise in liquid level 207 indicates that inner tubular member $P_i$ has begun to leak fluid under pressure into interstitial space $S_i$. Sensor 209 will thus indicate such a leak. Similarly, since the pressure of the liquid in the interstitial space $S_i$ will normally be greater than the ambient pressure outside the system, a drop of level 207 below sensors 219 and 221 indicates that outer tubular member $P_o$ has a leak.

Thus, connection via fitting 204 in FIG. 2 from the interstitial space $S_i$ provides two functions. First, the entire closed interstitial path, including the channels in the fittings, and all of the pipe segments can be tested by pressure or vacuum through tube 203 from a source of gas pressure or vacuum, not shown, to determine if leaks are present in the fittings, coupling assemblies and the like. Necessary repairs can be made upon installation of the system. If the system passes inspection, it is ready to use.

The second function is to connect interstitial space $S_i$ via fitting 204 to tube 203 to fill the entire interstitial space of the system, including channels in the fittings, and other portions of the closed, continuous monitoring path or zone.

Figure 17A:
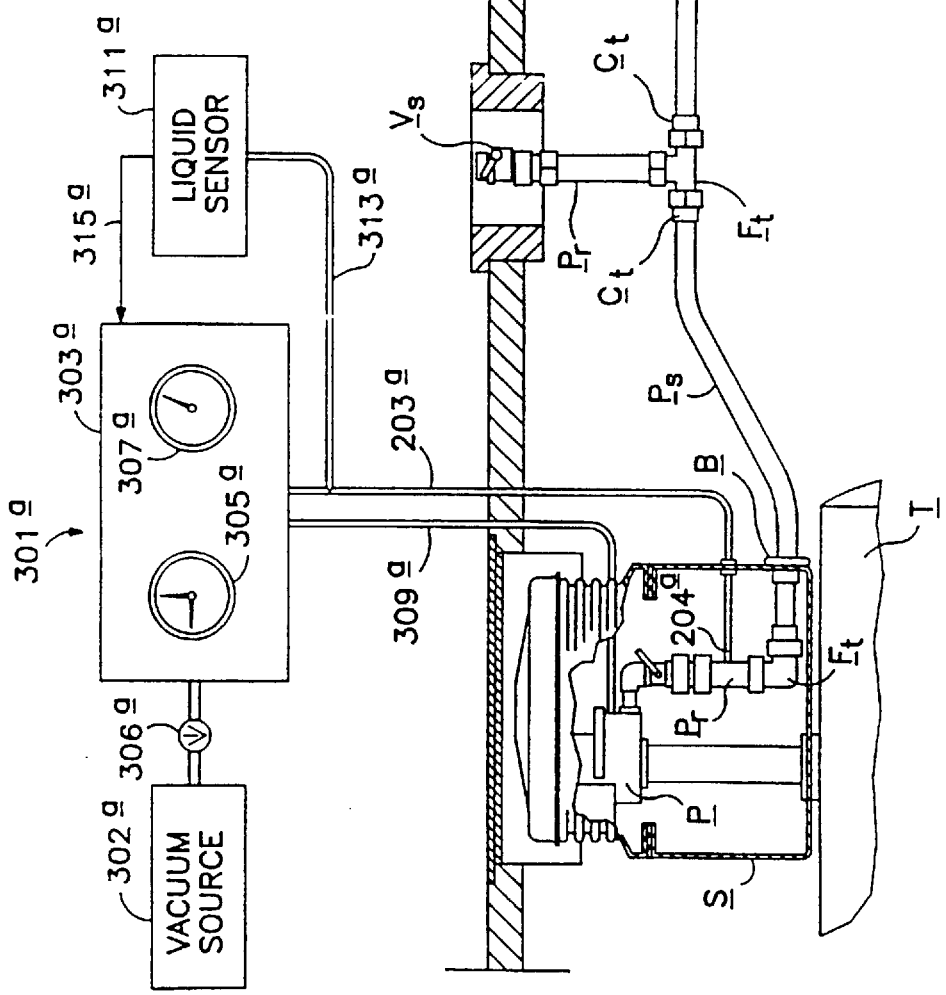
FIG. 17a is a schematic illustration of an underground piping system similar to FIG. 1, in which a vacuum source and other elements are used to monitor and test the system for the presence of leaks.

An alterative monitoring system is shown in FIG. 17a, as system 301a generally, which system operates using a vacuum such as from the suction port of a submersible turbine pump housing or by an external vacuum generating source 302a Control box 303a includes a timer 305a and a vacuum gauge 307a for measuring and controlling the vacuum pulled on the interstitial space $S_i$ via tube $_{203}$a. Tube 203a accesses the interstitial space $S_i$ through fitting 204a as previously described with reference to FIGS. 1 and 2.

Figure 22:
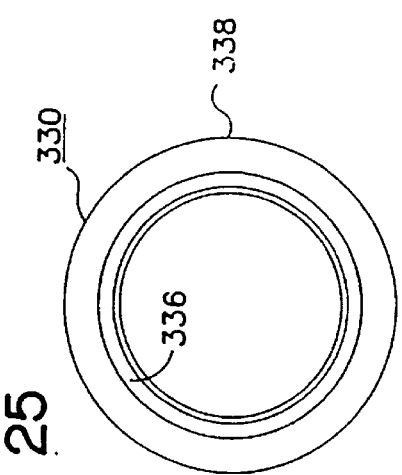
FIG. 22 is an end elevational view of the plastic ferrule of the second embodiment of coupling assembly.

In FIGS. 18–25 is shown an especially preferred embodiment of the coupling assembly 390 of the invention. As shown therein, the coupling assembly includes insert 330, ferrule $F_1$ and swivel nut N. Ferrule $F_1$, as shown in FIG. 22, includes interstitial channels 326. Ferrule $F_1$, insert 330 and swivel nut $N_1$ of this alternative embodiment can be preassembled into coupling 390 for joining to coaxial piping having interstitial channels therein.

As shown in FIGS. 18–25, ferrule $F_1$ includes swivel nut retention rib 310 for retaining swivel nut $N_1$.

Figure 23:
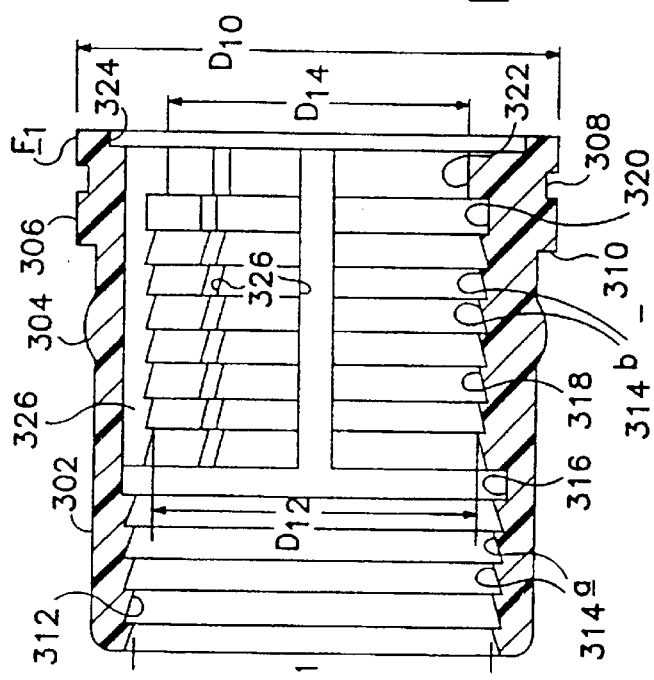
FIG. 23 is a sectional elevational view taken on the line 23, 23 of FIG. 22 showing details of the plastic ferrule.

Ferrule $F_1$ is fitted to the terminal end of coaxial pipe $P_s$. With reference to FIG. 23, ferrule $F_1$ includes a cylindrical shaped main body portion 302 whose outer surface has thereon a circumferentially extending nut retention rib 304 and a truncated cylindrical portion 306 of slightly greater diameter than the body portion 302. Portion 306 includes an O-ring retention slot 308. Portion 306 forms a circumferentially extending shoulder 310 with main body portion 302.

The inner surface of ferrule $F_1$ has a stepped configuration. The interior of ferrule $F_1$ has a first bore 312 of diameter $D_{11}$ sized to engage the outer surface of coaxial pipe $P_1$. Bore 312 typically extends about one-third of the axial length of ferrule $F_1$. Bore 312 includes a series of equally spaced circumferentially extending saw teeth 314a which bitingly engage the outer surface of pipe $P_o$ when assembled, as shown in FIG. 18. Bore 312 terminates at, and directly joins a first annual circumferentially extending channel 316. A second bore 318, adjacent channel 316, and having a diameter of $D_{12}$ smaller than diameter $D_{11}$ of bore 312, includes a series of equally spaced circumferentially extending saw teeth 314b which bitingly engage the outer surface of inner pipe $P_i$ when assembled, as also shown in FIG. 18. Second bore 318 terminates adjacent a second circumferentially extending channel 320. A third bore 322 of diameter $D_{14}$ is adjacent a second circumferentially extending channel 320. A third bore 322 of diameter $D_{14}$ is adjacent to channel 320. Bore 322 is designed to retain and locate insert 330 during assembly.

Insert 330 comprises metal, preferably stainless steel. The outer terminal face of ferrule $F_1$ is provided with counter bore 324. Counter bore 324 creates a channel 420 when connected to fitting 400 as shown in FIG. 18. As shown in FIG. 23, a series of equally spaced radially extending interstitial slots 326 extend axially from counter bore 324 to first channel 316 to provide unrestricted flow of interstitial fluid from coupling 390 to fitting 400 when connected.

Figure 25:
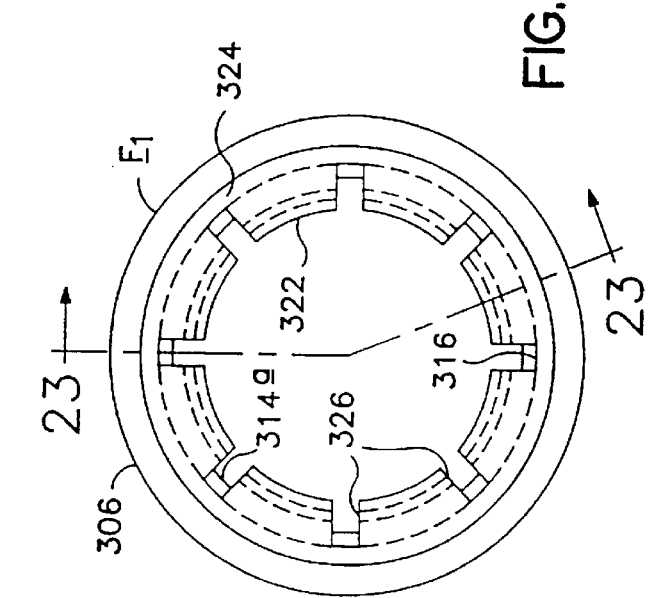
FIG. 25 is an end elevational view of the insert shown in FIG. 24.
Figure 24:
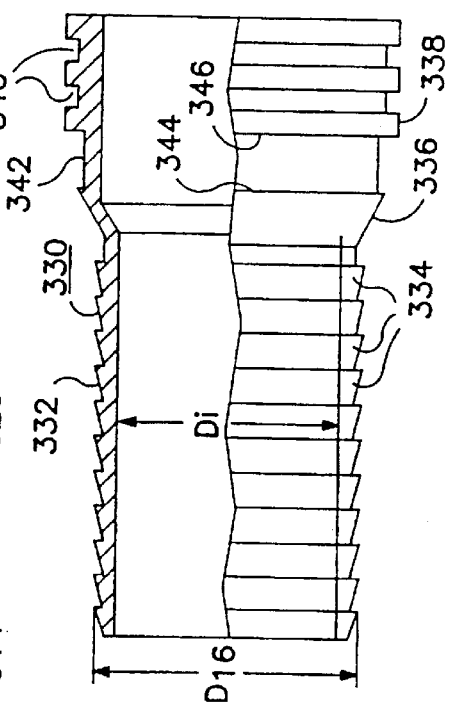
FIG. 24 is a side elevational view partially in section of the insert employed in the second embodiment of the coupling assembly.

Insert 330, as shown in FIGS. 24 and 25 includes hollow, cylindrically shaped main body portion 332 whose outer surface includes equally spaced circumferentially extending saw teeth 334 having an outer diameter $D_{16}$ sized to snugly fit within the inner diameter of inner pipe $P_i$ prior to expansion against the interior surface of $P_i$. Main body portion 332 is integral with truncated conical transition portion 336 that joins cylindrical body portion 332 to an enlarged truncated cylindrical sleeve 338. Sleeve 338 is provided with circumferentially extending grooves 340 for retention of O-rings 354 (see FIG. 19). Conical transition portion 336 has a relatively thin cross section to accommodate the controlled and isolated expansion of main body portion 332 into the inner surface of pipe $P_i$. Portion 336 also serves as an abutment surface for inner pipe $P_i$ during joining of pipe $P_i$ onto insert 330. Insert 330 also includes circumferentially extending groove 342 located between the base of the conical transition portion 336 and sleeve 338. Groove 342 has side walls 344 and 346. During assembly, groove 342 forms tightly fitting seal for the surfaces of bore 322 of ferrule $F_1$ and positions the prepared terminal ends of pipes $P_o$ and $P_i$ with ferrule $F_1$ and insert 330 prior to the expansion of main body portion 332 of insert 330 into the interior surface of pipe $P_i$.

Nut N is positioned on ferrule $F_1$ between nut retention rib 304 and shoulder 310 of ferrule $F_1$. Nut N is provided with internal threads 350 of square configuration, and ferrule $F_1$ is provided with O-ring 352 in groove 308. Insert 330 also is provided with O-rings 354 in retention grooves 340. Joining of insert 330 at groove 324 with the surfaces of bore 322, and joining of nut N, onto the exterior surface of ferrule $F_1$ provides a completed coupling assembly 390.

Shown in FIG. 19 is a fragmentary portion of a transition fitting 400 in the form of, for example, a "T" fitting. The outer terminal end of fitting 400 includes external threads 402 of square cross section. Fitting 400 is provided with a stepped base having a first bore 404 dimensioned to sealingly fit over cylindrical portion 306 of ferrule $F_1$ by means of O-ring 352. Fitting 400 also has a second bore 406 dimensioned to sealingly fit over cylindrical sleeve 338 of insert 330 by O-rings 354. A through bore 408 of about the same diameter as the inner diameter of sleeve 338 of insert 330 runs axially through fitting 400 to a similar arrangement on its opposite terminal end and its vertical terminal end. Fitting 400 includes external ribs 410 spaced in 90 degree intervals around the external periphery of fitting 400. Each of ribs 410 has external, axially extending interstitial bores 412 for transfer of interstitial fluid to the terminal ends of fitting 400.

When coupling assembly 390 is secured to fitting 400, as shown in FIG. 18, by nut $N_1$, a circumferentially extending channel 420 is formed by counter bore 324 on the outer terminal end of ferrule $F_1$, sleeve 338 of insert 330, and inner wall 418 of bore 404 in fitting 400. When so secured, interstitial fluid in interstitial space $S_i$ of flexible pipe $P_s$ can flow into annular chamber 316 through radially disposed interstitial slots 326, and into annular channel 420. The interstitial fluid can then flow into and through bores 412 of fitting 400 to both the vertical and horizontal outer terminal ends of fitting 400. Fluid in inner pipe $P_i$ can then be isolated from the interstitial fluid.

Ferrule $F_1$, swivel nut $N_1$, and transition fitting 400 preferably are formed from glass plastic composite materials such as Celstran available from Polymer Composites Co., Inc., Winona, Minn. (USA).

Assembly of coupling 390 entails locating nut $N_1$ between swivel nut retention rib 304 and shoulder 310 on ferrule $F_1$ to retain nut $N_1$ on ferrule $F_1$. Thereafter, insert 330 is inserted into ferrule $F_1$ so that slot 342 of insert 330 engages surface of bore 322 of ferrule $F_1$. Coupling assembly 390 can thus be preassembled prior to use at the field site. Interengaging threads of swivel nut $N_1$ and those on fitting 400 are preferably large threads to facilitate easy turning of swivel nut N by hand onto fitting 400.

The connection of the coupling 390 is similar to joining coupling $C_t$ as described above. More specifically, and as shown for example in FIG. 18, outer tubular member $P_o$ of pipe segment $P_s$ is prepared to receive coupling 390 by trimming outer tubular member $P_o$ to expose an axial length of inner tubular member $P_i$ at its axial end. The axial length is predetermined so that when pipe segment $P_s$ is inserted into the annual space between ferrule $F_1$ and insert 330, the axial end of inner tubular member $P_i$ abuts shoulder 336 on sleeve 330. In this position, swaging tool 130 can be pulled through sleeve 330 to press it radially outwardly so that confronting teeth 312 on ferrule $F_1$ and teeth 332 of insert 330 penetrate inner and outer tubular members $P_i$ and $P_o$ of pipe segments $P_s$ to firmly lock the parts in place.

Ferrule $F_1$ is joined to fitting 400 by causing swivel nut $N_1$ of ferrule $F_1$ to engage threads 402 of fitting 400, as best shown in FIGS. 18 and 19. Hand tightening of nut $N_1$ onto fitting 400 causes the terminal faces of insert 330 and ferrule $F_1$, respectively, to abut the terminal faces of bores 404 and 406, respectively, of fitting 400. In so doing, O-rings 352 and 354 engage the interior surfaces of bores 404 and 406, respectively, of fitting 400 to form tight, leak proof seals therewith, again as shown in FIG. 18.

In the assembled position shown in FIG. 18, a circumferentially extending channel 420 is formed at the juncture of interstitial slots 326 in ferrule $F_1$ and circumferentially spaced transition channels 412 in fitting 400 to ensure fluid communication between interstitial $S_i$ of pipe segments $P_s$ through transition coupling 390 and transition fitting 400. Prior to connecting ferrule $F_1$ to fitting 400, a coaxial piping segment $P_s$, such as coaxial piping sold by Environ Products, Inc., Lionville, Pa. (USA) under the trademark GEOFLEX, can be joined to coupling assembly 390 as shown in FIG. 18.

In an even more preferred embodiment of the invention, and as shown in FIGS. 26–29, a transition coupling generally shown as 600 and a transition fitting 500 are illustrated. Fitting 500, as shown in FIG. 29, includes outer housing 574 (see FIG. 27) having a first interior surface 570 and interior bore section 572. Interior bore section 572 has an exterior surface, as shown in FIGS. 27 and 29, that is within outer housing 574. Bore section 572 is suspended from interior surface 570 by connecting ribs 556 to provide interstitial channels 504 between the interior surface 570 and the exterior surface of the bore section. Channels 504 enable unrestricted flow of interstitial fluid through transition fitting 500.

Fitting 500 may be provided in various forms such as, for example, and elbow or a T-fitting. Regardless, channels 504 are provided to permit flow of interstitial fluid in both the horizontal portion as well as vertical riser portion of the fitting. Channels 504 thus enable monitoring of pressure within the interstitial space of a piping system formed of coaxial pipe, coupling assembly 600 and the transition fitting 500.

Fitting 500, as shown in FIG. 27, includes an outer bore having sealing surface 536, intermediate bore having sealing surface 530, and an inner bore 528. The outer bore having sealing surface 536 is approximately the same diameter as the outer surface 538 of ferrule 552. Surface 538 is provided with at least one slot, as shown in FIG. 27, for receiving O-ring seal 510 therein. The intermediate bore having sealing surface 530 is approximately the same diameter as outer surface 532 of insert 518. Surface 530 sealingly engages surface 532 of insert 518 that has grooves 534 that has O-rings 526 therein. Insert 518 preferably is formed of stainless steel to provide a tight seal upon joining of fitting 500 and coupling assembly 600.

Ferrule 552, nut 506 and insert 518 can be preassembled to provide coupling 600 prior to joining coupling 600 to coaxial pipe $P_s$. Coaxial pipe $P_s$ includes outer containment jacket 512, primary pipe 516 and interstitial space 514.

Swivel nut 506 of transition coupling 600 is configured to engage the exterior surface of ferrule 552 in the region between swivel nut retention rib 508 and shoulder 548, as shown in FIG. 27. Swivel nut 506, when contacting shoulder 548, axially extends beyond ferrule 552. Thus, during tightening of swivel nut 506 to join coupling assembly 600 to transition fitting 500, preferably by hand tightening, threaded portions 558 of swivel nut 506 engage threads 502 of fitting 500 to cause ferrule 552 and insert 518 to sealingly engage fitting 500 as shown in FIG. 26. Swivel nut 506 conveniently includes ribs 550 thereon (FIG. 28) to aid in hand tightening of swivel nut 506 onto fitting 500.

Figure 31:
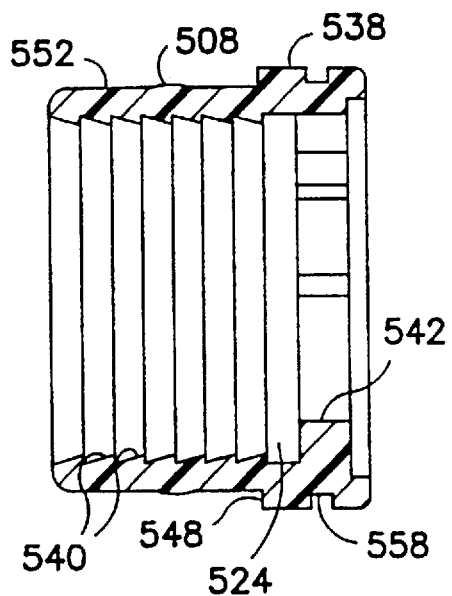
FIG. 31 is a cross-sectional view of the ferrule shown in FIG. 30 taken along line 33—33.
Figure 30:
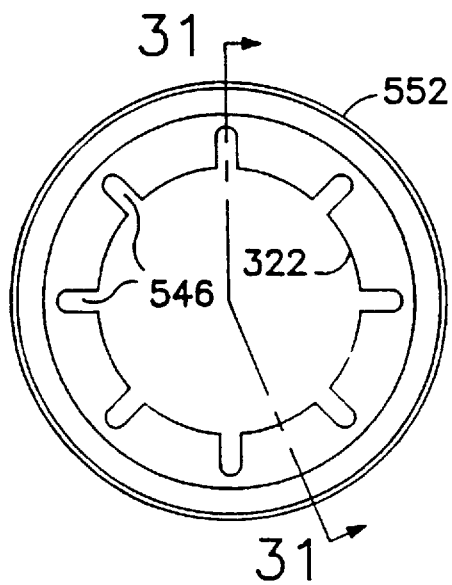
FIG. 30 is an end view of the ferrule employed in the coupling assembly shown in FIG. 27.
Figure 32:
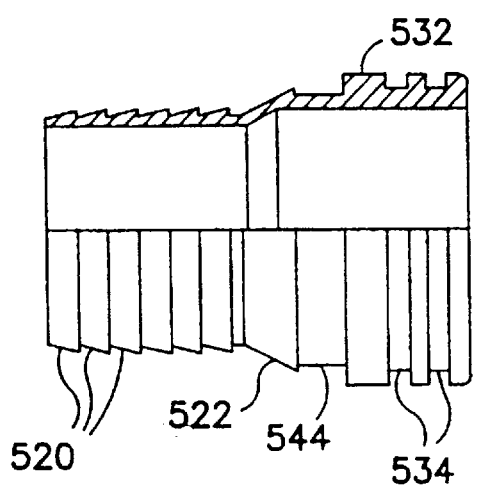
FIG. 32 is a partial sectional view of the insert employed in the coupling assembly shown in FIG. 27.
Figure 33:
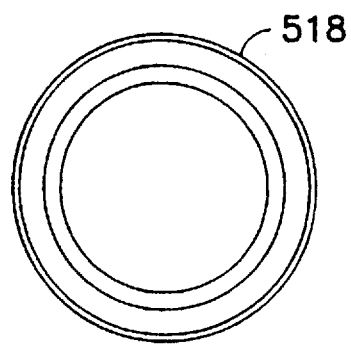
FIG. 33 is an end view of the insert shown in FIG. 26.

Ferrule 552, as illustrated in FIGS. 30–31, includes teeth 540 for engaging exterior jacket 512 of coaxial pipe segment $P_s$. Ferrule 552 includes interstitial channels 546 to enable flow of interstitial fluid. Ferrule 552 also includes interiorly extending rib 542 for engaging groove 544 of insert 518. Insert 518 includes interlocking rib 522 for engaging rib 542 of ferrule 552, as shown in FIG. 27. Insert 518, as illustrated in FIGS. 26, 27, 32 and 33 includes teeth 520 for engaging the interior surface of primary pipe 516.

In the assembled configuration of coupling assembly 600 and fitting 500, as shown in FIG. 26, a continuous flow path is provided within a piping system. More specifically, a continuous flow path is provided with interstitial channel 504 of fitting 500, channel 560 formed between ferrule 552 and bore portion 572 of ferrule 500, as well as with interstitial channel 524 in ferrule 552 and interstitial space 514 of pipe segment $P_s$.

Transition coupling 600 provides the advantageous benefit of enabling joining to coaxial pipe segment $P_s$ without the need to remove a portion of outer jacket 512 of pipe segment $P_s$. Accordingly, pipe segment $P_s$ is placed within ferrule 552 and over insert 518 until segment $P_s$ contacts shoulder 566 of insert 518. In this position, swaging tool 130 can be pulled through insert 518 to press it radially outwardly so that teeth 540 on ferrule $F_1$ and teeth 520 of insert 518 penetrate inner pipe 516 and outer jacket 512 to firmly lock the parts in place.

Transition coupling 600, when joined with transition fitting 500, provides a pipe coupling assembly that can withstand elevated pressures of about 700 psi without failure. Accordingly, sumps may not be required.

Even though particular embodiments of the present invention have been illustrated as described herein, it is not intended to limit the invention and changes and modifications may be made therein within the scope of the following claims.

I claim:

1. A pipe system for distributing fluids, comprising:
   a supply tank;
   a means for pumping fluid from said supply tank;
   at least one means for dispensing said fluid;
   a plurality of pipe segments connecting said pumping means to said dispensing means, said pipe segments having an inner tubular member for transferring said fluid, an outer tubular member, and an interstitial space therebetween;
   a transition coupling for attachment to said pipe segments to provide a first path for fluid in said inner tubular member and a second path for said interstitial space; and
   a transition fitting for attachment to said transition coupling to provide separate paths for said fluid and said interstitial space;
   said transition coupling comprising a ferrule, an insert, and a means for coupling to the transition fitting, said ferrule attached to said outer tubular member at its terminal end and having an outer annular flange and a passageway aligned with said interstitial space, said insert attached to said inner tubular member at its terminal end and having an inner annular flange to cooperate with said outer annular flange to define a circumferentially extending chamber, and said coupling means attached to said ferrule for coupling engagement with said transition fitting;
   said transition fitting comprising a channel aligned for engagement with said chamber, and seal pockets for sealing engagement with said outer and inner flanges.

2. The system of claim 1, wherein said insert comprises metal and said ferrule and said transition fitting comprise nondegradable plastic, and
   said insert is contained within said ferrule to prevent exposure of said insert when said assembly is in coupling engagement.

3. The system of claim 2 wherein said nondegradable plastic is selected from the group consisting of nylon, polyethylene and glass fiber filled plastic composite.

4. The system of claim 2 wherein said metal insert is internally expanded into said inner tubular member.

5. The system of claim 1, wherein said means for coupling is a nondegradable plastic swivel nut, and said transition fitting comprises threads for coupling engagement with said nut.

6. The system of claim 1 wherein said seal pockets each comprise an O-ring, and said outer and inner annular flanges extend into said seal pockets for sealing engagement with said O-rings.

7. The system of claim 1, wherein said ferrule is attached to said outer tubular member using teeth formed in said ferrule for deformational engagement with said outer tubular member.

8. The system of claim 1, wherein said insert is attached to said inner tubular member using teeth formed in said insert for deformational engagement with said inner tubular member upon expansion of said insert.

9. The system of claim 1, further comprising a back-off restrictor for engaging said coupling means to prevent movement of said coupling means due to vibration.

10. The system of claim 1, wherein said transition fitting comprises a first channel forming a pass-through channel aligned along said axial direction of said transfer pipe, and further comprises a second channel forming a directional channel aligned in a direction other than said axial direction.

11. The system of claim 1, wherein said second path is a closed path interconnecting all interstitial space in said system.

* * * * *